United States Patent [19]
Kimura

[11] Patent Number: 6,133,976
[45] Date of Patent: Oct. 17, 2000

[54] REFLECTION-TYPE TWO-DIMENSIONAL MATRIX SPATIAL LIGHT MODULATION DEVICE

[75] Inventor: Koichi Kimura, Shizuoka-ken, Japan

[73] Assignee: Fuji Photo Film Co., Ltd., Kanagawa-ken, Japan

[21] Appl. No.: 09/061,107

[22] Filed: Apr. 16, 1998

[30] Foreign Application Priority Data

Apr. 16, 1997 [JP] Japan ..................................... 9-098949

[51] Int. Cl.$^7$ ......................... G02F 1/1333; G02F 1/136; G02F 1/1335
[52] U.S. Cl. ............................ 349/138; 349/44; 349/110; 349/113
[58] Field of Search ................... 349/110, 111, 349/44, 113, 138

[56] References Cited

U.S. PATENT DOCUMENTS

| | | | |
|---|---|---|---|
| 4,602,850 | 7/1986 | DeBenedetti | 350/333 |
| 5,128,786 | 7/1992 | Yanagisawa | 359/67 |
| 5,194,976 | 3/1993 | Nakano et al. | 359/79 |
| 5,396,354 | 3/1995 | Shimada et al. | 359/58 |
| 5,500,750 | 3/1996 | Kanbe et al. | 359/58 |
| 5,986,723 | 11/1999 | Nakamura et al. | 349/39 |
| 6,005,648 | 12/1999 | Zhang et al. | 349/43 |

*Primary Examiner*—James A. Dudek
*Assistant Examiner*—Tarifur R. Chowdhury
*Attorney, Agent, or Firm*—Sughrue, Mion, Zinn, Macpeak & Seas, PLLC

[57] ABSTRACT

A spatial light modulation device comprises picture element electrodes located in the form of a two-dimensional matrix, an opposite electrode located at a spacing from the picture element electrodes, and a light modulation layer located between the opposite electrode and the picture element electrodes. The light modulation layer modulates light, which enters from the side of the opposite electrode and is then reflected from the picture element electrodes (or from reflection members located at positions deeper than the picture element electrodes), in accordance with a voltage applied by the opposite electrode and each picture element electrode. An insulation film is formed between the light modulation layer and the picture element electrodes. An electrically conductive film is formed with the insulation film intervening between the electrically conductive film and the picture element electrodes, and covers at least a portion of a gap between adjacent picture element electrodes.

33 Claims, 28 Drawing Sheets

INCIDENT POLARIZATION AXIS

F I G. 31
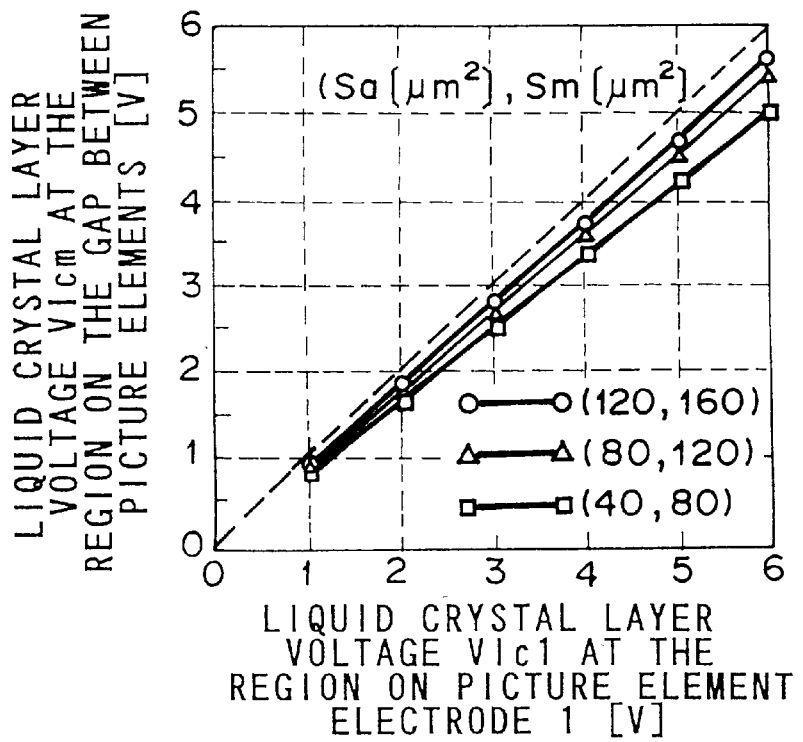
F I G. 32
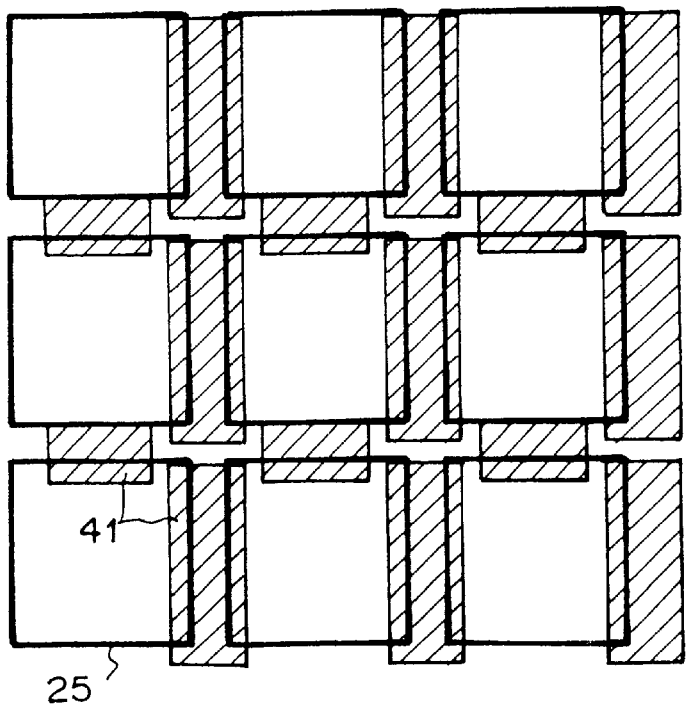

poly-Si TFT a-Si TFT

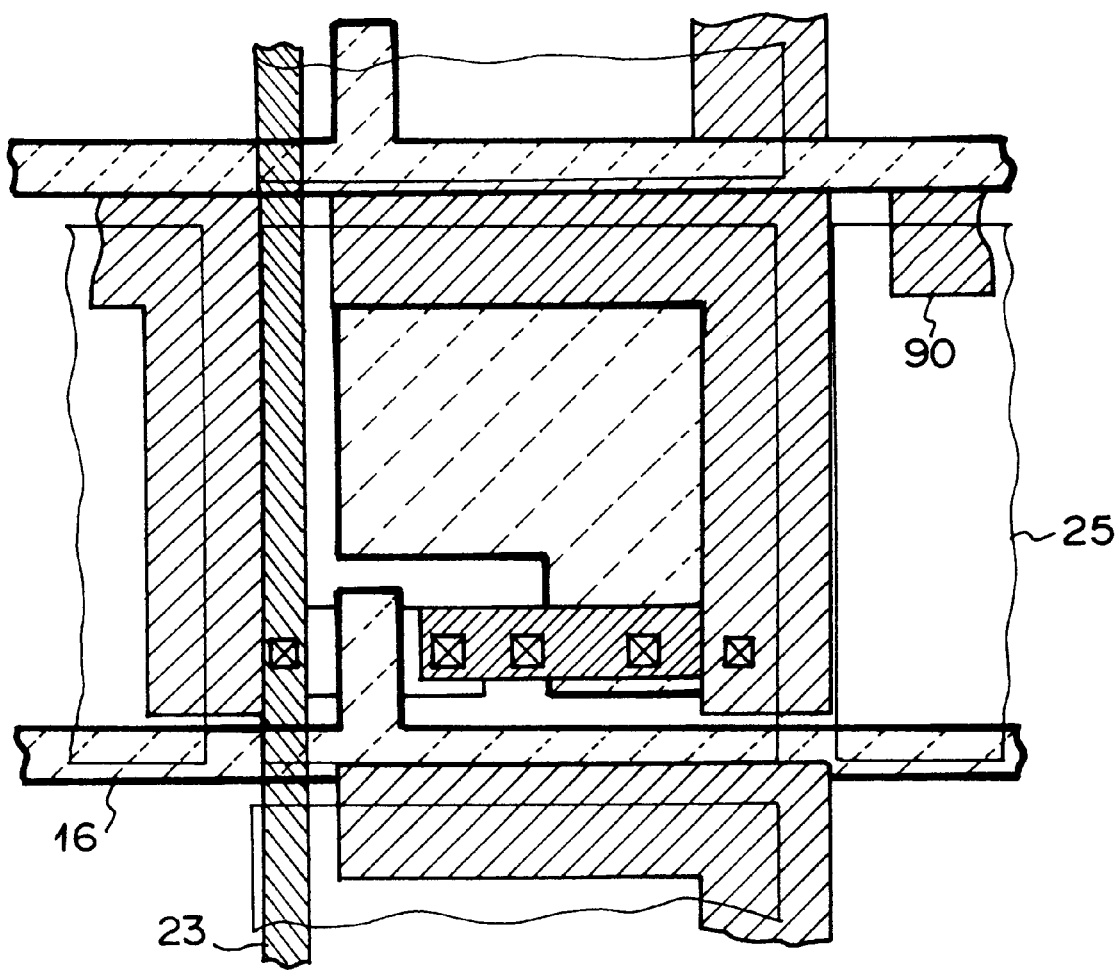
F I G. 38

6,133,976

REFLECTION-TYPE TWO-DIMENSIONAL MATRIX SPATIAL LIGHT MODULATION DEVICE

BACKGROUND OF THE INVENTION

1. Field of the Invention

This invention relates to a reflection-type two-dimensional matrix spatial light modulation device, which is used for a reflection-type flat display device, a video projector, exposure of a photosensitive material, or the like.

2. Description of the Prior Art

Reflection-type two-dimensional matrix spatial light modulation devices have heretofore been utilized in order to constitute reflection-type flat display devices, or the like. A typical one of the reflection-type two-dimensional matrix spatial light modulation devices comprises:

i) a plurality of picture element electrodes, which are located in the form of a two-dimensional matrix made up of rows and columns, ii) an opposite electrode, which is located at a spacing from the picture element electrodes, and iii) a light modulation layer, such as a liquid crystal layer, which is located between the opposite electrode and the picture element electrodes, the light modulation layer modulating light, which enters from the side of the opposite electrode into the light modulation layer and is then reflected from the picture element electrodes (or from reflection members located at positions deeper than the picture element electrodes), in accordance with a voltage applied across the light modulation layer by the opposite electrode and each of the picture element electrodes.

As an example, a reflection-type two-dimensional matrix spatial light modulation device, in which a liquid crystal is employed as the light modulation layer, will hereinbelow be described in detail.

Structure of the device

FIG. 1 is a schematic vertical sectional view showing a picture element section of a conventional reflection-type two-dimensional matrix spatial light modulation device. As illustrated in FIG. 1, an n-MOS-FET 11 and a charge storage capacity Cstg 12 are formed on a single crystalline p$^-$-type silicon semiconductor substrate 10. The n-MOS-FET 11 comprises an n$^+$-type drain region 13, an n$^+$-type source region 14, a gate oxide film 15, and a gate electrode 16 constituted of a poly-Si film. The charge storage capacity Cstg 12 comprises a p+region 17, an oxide film 18, and a poly-Si film 19.

A first-layer Al wiring 21 is formed on the side across a first layer-insulation film 20, and a source electrode 22 connected to the source region 14 is thereby formed. The source region 14 and the poly-Si film 19 of the charge storage capacity Cstg 12 are connected to each other by the source electrode 22. A drain electrode 23 is connected to the drain region 13. Also, a picture element electrode (second-layer Al) 25 is formed on the side across a second layer-insulation film 24 and is connected to the source electrode 22.

An orientation film 26 is formed on the picture element electrode 25. An opposite transparent common electrode 28 constituted of ITO is formed on one side of an opposite transparent substrate 27, and an orientation film 29 is formed on the opposite transparent common electrode 28. The two substrates 10 and 27 are located such that the orientation film 26, which is combined integrally with the substrate 10, and the orientation film 29, which is combined integrally with the substrate 27, may stand facing each other. A liquid crystal 30 is held between the orientation film 26 and the orientation film 29.

FIG. 2 is a circuit diagram showing a circuit equivalent to the picture element section of the spatial light modulation device shown in FIG. 1. As illustrated in FIG. 2, the source electrode 22 of the n-MOS-FET 11, one side of the charge storage capacity Cstg 12, and the picture element electrode 25 are connected to one another.

The other side of the charge storage capacity Cstg 12 is connected to a power source ground potential Vss of the spatial light modulation device. Also, a capacity Clc is formed by the picture element electrode 25, the orientation films 26, 29, the liquid crystal 30, and the opposite transparent common electrode 28.

The gate electrode voltage of the n-MOS-FET 11, which is taken with respect to the power source ground potential Vss, is represented by Vg, and the drain electrode voltage, which is taken with respect to the power source ground potential Vss, is represented by Vd. The source electrode voltage, which is taken with respect to the power source ground potential Vss, is represented by Vs, and the opposite transparent common electrode voltage, which is taken with respect to the power source ground potential Vss, is represented by Vcom. Also, the picture element electrode voltage, which is taken with respect to Vcom, is represented as a liquid crystal layer voltage Vlc.

Fundamental operation of the device

There are various kinds of liquid crystals, which serve as light modulation materials, and various electro-optic modes of them. Several examples will be described hereinbelow.

(1) Example using a ferroelectric liquid crystal

FIG. 3 is a schematic view showing a light modulating optical system utilizing the spatial light modulation device shown in FIG. 1, the view serving as an aid in explaining a fundamental operation of the spatial light modulation device. As illustrated in FIG. 3, a polarization beam splitter (hereinbelow referred to as the PBS) 6 is located on the opposite transparent substrate side of a spatial light modulation device 5. Light is produced by a light source 7 and is irradiated to the PBS 6. As a result, the S-polarized wave is reflected by the PBS 6 and impinges upon the opposite transparent substrate 27 of the spatial light modulation device 5. The incident light passes through the layer of the liquid crystal 30 and is reflected from the picture element electrode 25. The reflected light passes through the liquid crystal layer and impinges upon the PBS 6. At this time, only the P-polarized wave component of the reflected light passes through the PBS 6 and is thereby obtained as the output light.

FIG. 4 is an explanatory view showing the relationship between the liquid crystal layer voltage Vlc and the position of orientation of the liquid crystal, the view serving as an aid in explaining the fundamental operation of the spatial light modulation device shown in FIG. 1. In this example, as the liquid crystal, a ferroelectric liquid crystal exhibiting bistable orientation is used. As illustrated in FIG. 4, orientation processing is carried out such that, when the liquid crystal layer voltage Vlc is equal to −Vlcs, the direction along which the liquid crystal is orientated may coincide with the incident polarization axis, and such that, when the liquid crystal layer voltage Vlc is equal to Vlcs, the direction along which the liquid crystal is orientated may make an angle of 45 degrees with respect to the incident polarization axis. Also, the material of the liquid crystal and the thickness of the liquid crystal layer are adjusted appropriately such that, the direction along which the liquid crystal is orientated may make an angle of 45 degrees with respect to the incident polarization axis, the desired output light may be obtained.

In this manner, the output light goes to the off level when the liquid crystal layer voltage Vlc is equal to −Vlcs. Also, the output light goes to the on level when the liquid crystal layer voltage Vlc is equal to Vlcs.

FIG. 5 is a graph showing the voltages at the picture element section in the constitution described above with reference to FIGS. 1 through 4, and the wave form of output light. With reference to FIG. 5, firstly, such that the n-MOS-FET 11 may be triggered into a conducting state, the gate electrode voltage Vg is set at Vgon, which is of a sufficiently high level. At the same time, the drain electrode voltage Vd is set at Vd(on). As a result, the picture element voltage Vs becomes approximately equal to Vd(on). Thereafter, even if the gate electrode voltage Vg is set at Vgoff, which is of a sufficiently low level, such that the n-MOS-FET 11 may go to a non-conducting state, the picture element voltage Vs will be kept at approximately Vd(on) by the effects of the charge storage capacity Cstg 12 and the liquid crystal layer capacity Clc. Therefore, during this period as indicated by (a) in FIG. 5, the liquid crystal layer voltage Vlc is represented by the formula Vlc=(Vd(on)−Vcom).

Also, when the gate electrode voltage Vg is set to be sufficiently high such that the n-MOS-FET 11 may be triggered into a conducting state, and at the same time the drain electrode voltage Vd is set at Vd(off), the picture element voltage Vs becomes approximately equal to Vd(off). Thereafter, even if the gate electrode voltage Vg is set to be sufficiently low such that the n-MOS-FET 11 may go to a non-conducting state, the picture element voltage Vs will be kept at approximately Vd(off) by the effects of the charge storage capacity Cstg 12 and the liquid crystal layer capacity Clc. Therefore, during this period as indicated by (b) in FIG. 5, the liquid crystal layer voltage Vlc is represented approximately by the formula Vlc=(Vd(off)−Vcom).

In cases where the opposite transparent common electrode voltage Vcom is applied such that $$Vcom=(Vd(on)+Vd(off))/2$$

the liquid crystal layer voltage Vlc during the period (a) and the liquid crystal layer voltage Vlc during the period (b) are represented by the formulas shown below.

Period (a):

$$Vlc=(Vd(on)-Vd(off))/2$$

Period (b):

$$Vlc=-(Vd(on)-Vd(off))/2$$

In such cases, Vd(on) and Vd(off) may be determined such that the liquid crystal layer voltage Vlc during the period (a) may be equal to at least Vlcs and such that the liquid crystal layer voltage Vlc during the period (b) may be equal to at most −Vlcs. In this manner, the output light can be modulated such that it may be on during the period (a) and may be off during the period (b).

Actually, due to a parasitic capacity of the n-MOS-FET 11, or the like, it often occurs that the liquid crystal layer voltage Vlc during the period (a) and the liquid crystal layer voltage Vlc during the period (b) are not symmetric with respect to each other. In such cases, Vcom is adjusted such that the DC component may become zero.

(2) Example using an electrically controlled birefringence (ECB) mode liquid crystal In this example, as in FIG. 3, the PBS is utilized in the light modulating optical system.

FIG. 6 is a schematic plan view showing a liquid crystal orientation state in an ECB mode liquid crystal layer in accordance with the liquid crystal layer voltage Vlc. FIG. 7 is a schematic side view showing the liquid crystal orientation state in the ECB mode liquid crystal layer in accordance with the liquid crystal layer voltage Vlc. As the liquid crystal, an ECB mode liquid crystal is used, which has a negative dielectric constant anisotropy, which exhibits birefringence with the minor axis and the major axis of the molecule, and which operates with an AC voltage. As illustrated in FIGS. 6 and 7, when Vlc=0, the liquid crystal molecule is orientated vertically. When the AC voltage Vlc becomes high, the liquid crystal molecule inclines so as to become parallel to the electrode surface. The orientation processing is carried out such that the direction of inclination of the liquid crystal molecule may make an angle of approximately 45° with respect to the incident polarization axis.

FIG. 8 is a graph showing dependency of reflected output light, which is obtained from the ECB mode liquid crystal layer, upon the liquid crystal layer voltage.

As illustrated in FIG. 8, when Vlc=0, the apparent birefringence, as viewed from the incident light side, is small, and the intensity of the reflected output light takes the lowest value. When Vlc is increased and goes beyond a threshold value voltage Vlc(th), the liquid crystal molecule begins inclining, the apparent birefringence becomes large, and the intensity of the reflected output light becomes high. At the time at which Vlc=Vlcs, the intensity of the reflected output light becomes highest.

Therefore, the reflected output light can be modulated by changing Vlc from Vlc(th) to Vlcs.

(3) Example using a polymer-dispersed liquid crystal

In this example, a Schlieren optical system is utilized in the light modulating optical system. The Schlieren optical system transmits non-scattered light and eliminates scattered light.

In an example of a polymer-dispersed liquid crystal, a liquid crystal having a positive dielectric constant anisotropy and operating with an AC voltage is dispersed in a polymer network. In such a polymer-dispersed liquid crystal, when Vlc=0, the liquid crystal molecule is regulated by the interface of the polymer and becomes orientated at random. When Vlc is increased, the liquid crystal molecule is orientated such that its major axis may be perpendicular to the electrode surface. In accordance with the relationship between the birefringence (ne))no) exhibited by the liquid crystal and the refractive index np (approximately equal to no) of the polymer, when the liquid crystal is orientated at random, the reflected light is scattered. Also, as the direction, along which the liquid crystal is orientated, becomes perpendicular to the electrode surface, the reflected light becomes non-scattered light. Therefore, the reflected light is scattered when Vlc=0, and becomes non-scattered light when Vlc is increased.

In cases where such reflected light is projected through the Schlieren optical system, the output light is obtained, which exhibits the dependency upon the voltage (AC voltage) as shown in FIG. 9. Specifically, when Vlc=0, the intensity of the output light takes the lowest value. When Vlc is increased and goes beyond a threshold value voltage Vlc(th), the intensity of the output light becomes high. At the time at which Vlc is equal to at least Vlcs, the intensity of the reflected output light becomes highest. Therefore, reflected output light can be modulated by changing Vlc from Vlc(th) to Vlcs.

(4) Example using a guest host liquid crystal (positive type)

In this example, it is unnecessary to use a particular light modulating optical system, and only a projection lens may be utilized.

An example of a guest host liquid crystal (positive type) comprises a cholesteric-nematic phase transition type of liquid crystal, which has a positive dielectric constant anisotropy and operates with an AC voltage, and a guest (a dichroic dye) added to the liquid crystal. When Vlc=0, the liquid crystal molecule takes a spiral form, the incident light is absorbed by the guest, and the intensity of the reflected output light takes the lowest value. When Vlc is increased, the spiral structure of the liquid crystal molecule is released, the liquid crystal molecule is orientated such that its major axis may be perpendicular to the electrode surface, and the guest stands in parallel with the liquid crystal molecule. Therefore, the degree of absorption of the incident light becomes low, and the intensity of the reflected output light becomes high.

FIG. 10 shows the dependency of the output light, which is obtained from the positive type of guest host liquid crystal layer, upon the voltage (AC voltage). As illustrated in FIG. 10, when Vlc=0, the intensity of the output light takes the lowest value. When Vlc is increased and goes beyond a threshold value voltage Vlc(th), the intensity of the output light becomes high. At the time at which Vlc is equal to at least Vlcs, the intensity of the reflected output light becomes highest. Therefore, the reflected output light can be modulated by changing Vlc from Vlc(th) to Vlcs.

(5) Example using a guest host liquid crystal (negative type)

In this example, as in the example described in (4), it is unnecessary to use a particular light modulating optical system, and only a projection lens may be utilized.

An example of a guest host liquid crystal (negative type) comprises a cholesteric-nematic phase transition type of liquid crystal, which has a negative dielectric constant anisotropy and operates with an AC voltage, and a guest (a dichroic dye) added to the liquid crystal. When Vlc=0, the liquid crystal molecule is orientated perpendicularly to the electrode surface, the degree of absorption of the incident light is low, and the intensity of the reflected output light takes the highest value. When Vlc is increased, the liquid crystal molecule takes a spiral form, the degree of absorption of the incident light becomes high, and the intensity of the reflected output light becomes low.

FIG. 11 shows the dependency of the output light, which is obtained from the negative type of guest host liquid crystal layer, upon the voltage (AC voltage). As illustrated in FIG. 11, when Vlc=0, the intensity of the output light takes the highest value. When Vlc is increased and goes beyond a threshold value voltage Vlc(th), the intensity of the output light becomes low. At the time at which Vlc is equal to at least Vlcs, the intensity of the reflected output light takes the lowest value. Therefore, the reflected output light can be modulated by changing Vlc from Vlc(th) to Vlcs.

As described above, the reflected output light can be modulated by the utilization of various operation modes of liquid crystals. The operations are those of the liquid crystal held between the opposite transparent common electrode and each of the picture element electrodes. However, as for the operation of the liquid crystal at the portion, which stands facing a gap between adjacent picture element electrodes, the problems often occur that the operation becomes indeterminate. The problems will be described hereinbelow.

FIG. 12 is an explanatory sectional view showing a region, which stands facing a picture element electrode, and a region, which stands facing a gap between adjacent picture element electrodes, in a conventional reflection-type two-dimensional matrix spatial light modulation device. With reference to FIG. 12, the liquid crystal layer voltage at the region, which stands facing a picture element electrode, is represented by Vlcp (=Vs−Vcom), and the liquid crystal layer voltage at the region, which stands facing a gap between adjacent picture element electrodes, is represented by Vlcm (which is taken with respect to Vcom). Also, the reflected output light obtained from the region, which stands facing the picture element electrode, is represented by Rp, and the reflected output light obtained from the region, which stands facing the gap between the adjacent picture element electrodes, is represented by Rm. As for the region, which stands facing the picture element electrode, Vlcp is determinate, and the output light undergoes the operations described above. However, as for the region, which stands facing the gap between the adjacent picture element electrodes, the liquid crystal layer potential with respect to Vcom is affected by potentials of the substrate, the picture element circuit, and the like, which are located below the gap between the adjacent picture element electrodes, and the electric fields coming from the adjacent picture element electrodes. As a result, Vlcm becomes indeterminate, and the reflected output light obtained from the region, which stands facing the gap between the adjacent picture element electrodes, becomes indefinite.

Specifically, in the aforesaid example using the ferroelectric liquid crystal, when the liquid crystal layer potential with respect to Vcom is higher than Vcom, the liquid crystal layer voltage Vlcm becomes positive, and the output light goes to the on level in accordance with FIG. 5.

In the aforesaid example using the ECB mode liquid crystal, the polymer-dispersed liquid crystal, or the guest host liquid crystal (positive type), when the liquid crystal layer voltage Vlcm at the region, which stands facing the gap between the adjacent picture element electrodes, shown in FIG. 12 is higher than Vlc(th), the intensity of the output light becomes higher than the of f level in accordance with FIG. 8, FIG. 9, or FIG. 10.

In the aforesaid example using the guest host liquid crystal (negative type), when the liquid crystal layer voltage Vlcm at the region, which stands facing the gap between the adjacent picture element electrodes, shown in FIG. 12 is lower than Vlcs, the intensity of the output light becomes higher than the off level in accordance with FIG. 11.

The foregoing means that unnecessary light is radiated out from the region, which stands facing the gap between the adjacent picture element electrodes. If such problems occur, in cases where the spatial light modulation device is utilized for a projector, the contrast will become low. Also, in cases where the spatial light modulation device is utilized for the exposure of a photosensitive material, the image quality will be affected adversely.

Further, if the light incident upon the spatial light modulation device leaks through the gap between the adjacent picture element electrodes to the semiconductor constituting the picture element circuit, the source potential will often be fluctuated due to optically pumped carrier. Fluctuations in the source potential also cause the image quality to become bad.

In cases where picture elements of a finer resolution are set, the device size is reduced even further, and the picture element size is thereby rendered smaller, the problems described above occur more markedly.

As a countermeasure for the problems described above, it has been proposed to locate an electrically conductive or non-conductive light blocking film (a light absorbing layer or a light reflecting layer) above a transistor, above a wiring, or between a picture element electrode and a picture element circuit. Such a countermeasure is proposed in, for example, Japanese Patent Publication Nos. 57(1982)-39422 and 61(1986)-43712. Also, it has been proposed to locate a dielectric multi-layer film on a transistor or on a picture element electrode and thereby to reflect incident light at a gap between picture elements. Such a countermeasure is proposed in, for example, Japanese Patent Publication No. 4(1992)-51070 and Japanese Unexamined Patent Publication No. 4(1992)-338721.

However, with the proposed countermeasures, even though the effects of reducing the light leaking to the semiconductor can be obtained, the requirements with regard to the image quality with the output light and the light utilization efficiency cannot be satisfied sufficiently.

FIG. 13 is a schematic view showing a distribution of intensity of output light obtained from various regions in a conventional reflection-type two-dimensional matrix spatial light modulation device, in which a light blocking layer is a light absorbing layer. As illustrated in FIG. 13, the intensity of the reflected output light, which is obtained from the region facing the gap between the adjacent picture elements, is always low, and therefore the light utilization efficiency cannot be kept high. Also, the portions, at which the intensity of the reflected output light is low, constitute a lattice-like black matrix. Accordingly, in cases where the spatial light modulation device is utilized for a projector, interference with a lattice-like optical element, such as a lenticular lens screen, is caused to occur, and the image quality cannot be kept good. Further, in cases where the spatial light modulation device is utilized for exposure of a negative photosensitive material, the region, which stands facing the gap between the adjacent picture elements, always constitutes a highlight in the obtained image, and therefore the contrast of the image becomes markedly low.

FIG. 14 is a schematic view showing a distribution of intensity of output light obtained from various regions in a different conventional reflection-type two-dimensional matrix spatial light modulation device, in which a light blocking layer is a light reflecting layer. As described above, the liquid crystal layer voltage at the region, which stands facing the gap between the adjacent picture elements, is unstable. Therefore, as illustrated in FIG. 14, the reflected output light Rm, which is obtained from the region facing the gap between the adjacent picture elements, becomes unstable. As a result, the image quality cannot be kept high.

In order for the aforesaid problems to be eliminated, there has also been proposed a countermeasure, in which electrically conductive light blocking layers are connected to an electric power source Vm that is common to the device, potentials of the electrically conductive light blocking layers are controlled, and the liquid crystal layer voltage at the region facing the gap between the adjacent picture elements is thereby stabilized. FIG. 15 is a schematic view showing a distribution of intensity of output light obtained from various regions in a further different conventional reflection-type two-dimensional matrix spatial light modulation device, in which electrically conductive light blocking layers are utilized. As illustrated in FIG. 15, with the proposed countermeasure, even though the liquid crystal layer voltage at the region, which stands facing the gap between the adjacent picture elements, becomes stable, since the electrically conductive light blocking layers are controlled with the voltage common to the device, the voltage always takes a fixed value regardless of the liquid crystal layer voltage at the region above each of the picture element electrodes.

Therefore, it cannot be said that the proposed countermeasure is a drastic countermeasure for the aforesaid problems. Further, with the proposed countermeasure, it is necessary to lay a particular wiring for connecting the light blocking layers to the electric power source Vm, and problems occur in that the production yield and the reliability cannot be kept high due to an increase in the number of processes, breakage of the wiring, and short-circuiting.

SUMMARY OF THE INVENTION

The primary object of the present invention is to provide a reflection-type two-dimensional matrix spatial light modulation device, wherein adverse effects of light leaking to a semiconductor constituting a picture element circuit are reduced by blocking light incident upon a gap between adjacent picture element electrodes, output light obtained from the gap between the adjacent picture element electrodes is utilized efficiently, the image quality with the output light is kept good, the production cost of the device is kept low, and reliability of the operations of the device is kept high.

The present invention provides a first reflection-type two-dimensional matrix spatial light modulation device, comprising:

i) a plurality of picture element electrodes, which are located in the form of a two-dimensional matrix made up of rows and columns, ii) an opposite electrode, which is located at a spacing from the picture element electrodes, and iii) a light modulation layer, which is located between the opposite electrode and the picture element electrodes, the light modulation layer modulating light, which enters from the side of the opposite electrode into the light modulation layer and is then reflected from the picture element electrodes (or from reflection members located at positions deeper than the picture element electrodes), in accordance with a voltage applied across the light modulation layer by the opposite electrode and each of the picture element electrodes, wherein the improvement comprises the provision of:

a) an insulation film, which is formed between the light modulation layer and the picture element electrodes, and b) an electrically conductive film, which is formed with the insulation film intervening between the electrically conductive film and the picture element electrodes, the electrically conductive film covering at least a portion of a gap between adjacent picture element electrodes.

In the first reflection-type two-dimensional matrix spatial light modulation device in accordance with the present invention, the electrically conductive film should preferably be in an electrically floating state.

Also, the electrically conductive film should preferably have a shape such that a portion thereof may overlap with at least one picture element electrode.

Further, the electrically conductive film should preferably have a shape such that it may cover the gap between a plurality of adjacent picture element electrodes and may have regions overlapping with a plurality of picture element electrodes.

In cases where the electrically conductive film has the shape described above, the first reflection-type two-dimensional matrix spatial light modulation device in accordance with the present invention should preferably be constituted such that the voltage applied across a portion of the light modulation layer, which portion is located on the electrically conductive film, may be approximately in proportion to (more preferably, may take a value approximately equal to) the voltage applied across a portion of the light modulation layer, which portion is located on the picture element electrode having a region overlapping with the electrically conductive film.

Further, the first reflection-type two-dimensional matrix spatial light modulation device in accordance with the present invention should preferably be constituted such that the voltage applied across a portion of the light modulation layer, which portion is located on the electrically conductive film, may take an intermediate value between (more preferably, an approximately mean value of) the voltages applied across portions of the light modulation layer, which portions are located on a plurality of picture element electrodes having regions overlapping with the electrically conductive film.

The present invention also provides a second reflection-type two-dimensional matrix spatial light modulation device, comprising:

i) a plurality of picture element electrodes, which are located in the form of a two-dimensional matrix made up of rows and columns, ii) an opposite electrode, which is located at a spacing from the picture element electrodes, and iii) a light modulation layer, which is located between the opposite electrode and the picture element electrodes, the light modulation layer modulating light, which enters from the side of the opposite electrode into the light modulation layer and is then reflected from the picture element electrodes (or from reflection members located at positions deeper than the picture element electrodes), in accordance with a voltage applied across the light modulation layer by the opposite electrode and each of the picture element electrodes, wherein the improvement comprises the provision of:

a) an insulation film, which is formed on the side of the picture element electrodes opposite to the light modulation layer with the picture element electrodes intervening between the insulation film and the light modulation layer, and b) an electrically conductive film, which is formed with the insulation film intervening between the electrically conductive film and the picture element electrodes, the electrically conductive film covering at least a portion of a gap between adjacent picture element electrodes, the electrically conductive film being electrically connected to at least one of the picture element electrodes constituting the gap.

The second reflection-type two-dimensional matrix spatial light modulation device in accordance with the present invention should preferably be constituted such that the voltage applied across a portion of the light modulation layer, which portion is located on the electrically conductive film, may be approximately in proportion to (more preferably, may take a value approximately equal to) the voltage applied across a portion of the light modulation layer, which portion is located on the picture element electrode electrically connected to the electrically conductive film.

In the first and second reflection-type two-dimensional matrix spatial light modulation devices in accordance with the present invention, the electrically conductive film may be a light reflecting film, which reflects the light entering from the side of the opposite electrode. Alternatively, the electrically conductive film may be a light absorbing film, which absorbs the light entering from the side of the opposite electrode. As another alternative, the electrically conductive film may be transparent with respect to the light.

Also, the electrically conductive film should preferably have reflecting, absorbing, or scattering characteristics approximately identical with those of the picture element electrodes.

Further, an anti-reflection film for the light entering from the side of the opposite electrode should preferably be located between the insulation film and the light modulation layer.

Furthermore, either one or both of the insulation film and a lower-layer film of the electrically conductive film should preferably be constituted of flattened films.

Also, the insulation film should preferably be transparent.

In the first and second reflection-type two-dimensional matrix spatial light modulation devices in accordance with the present invention, the light modulation layer may be constituted of, for example, a liquid crystal layer or an electroluminescence layer.

A picture element circuit, which controls the voltage applied across the light modulation layer by the opposite electrode and each of the picture element electrodes, may be constituted of, for example, a circuit containing an active element with a single crystalline semiconductor, a circuit containing an active element with a polycrystalline semiconductor, or a circuit containing an active element with an amorphous semiconductor.

With the first and second reflection-type two-dimensional matrix spatial light modulation devices in accordance with the present invention, the electrically conductive film, which covers at least a portion of the gap between adjacent picture element electrodes, is formed. Therefore, the state of the portion of the light modulation layer, which portion is located on the electrically conductive film, can be rendered close to the state of the portions of the light modulation layer, which portions are located on the picture element electrodes that constitute the gap.

Accordingly, in cases where the electrically conductive film is imparted with the light reflecting characteristics as in the picture element electrode, the intensity of the modulated output light, which is reflected from the electrically conductive film, becomes close to the intensity of the modulated output light, which is reflected from the neighboring picture element electrodes. As a result, while the image quality obtained with the output light is being kept good, the incident light at the region, which stands facing the gap between the adjacent picture elements, can be utilized efficiently, and the amount of the output light as a whole can be kept large.

Also, with the first and second reflection-type two-dimensional matrix spatial light modulation devices in accordance with the present invention, wherein it is unnecessary for the electrically conductive film to be connected to a particular electric power source, the problems can be prevented from occurring in that the cost becomes high due to the connection to such a particular electric power source.

Further, in cases where the electrically conductive film is imparted with the light reflecting characteristics or the light absorbing characteristics, the incident light at the gap between the picture elements can be blocked by the electrically conductive film, and the adverse effects of light leaking to the semiconductor, which constitutes the picture element circuit, can be reduced.

BRIEF DESCRIPTION OF THE DRAWINGS

FIG. 31 is a graph showing the relationship between the liquid crystal layer voltage at the region, which is located on a picture element electrode, and the liquid crystal layer voltage at the region, which stands facing the gap between the adjacent picture elements, in the spatial light modulation device shown in FIG. 28, FIG. 32 is a schematic plan view showing how picture element electrodes and picture element gap electrodes are located in a fourth embodiment of the reflection-type two-dimensional matrix spatial light modulation device in accordance with the present invention, FIG. 38 is a plan view showing the major part of the spatial light modulation device shown in FIG. 37.

DESCRIPTION OF THE PREFERRED EMBODIMENTS

The present invention will hereinbelow be described in further detail with reference to the accompanying drawings.
<First embodiment>

Figure 1:
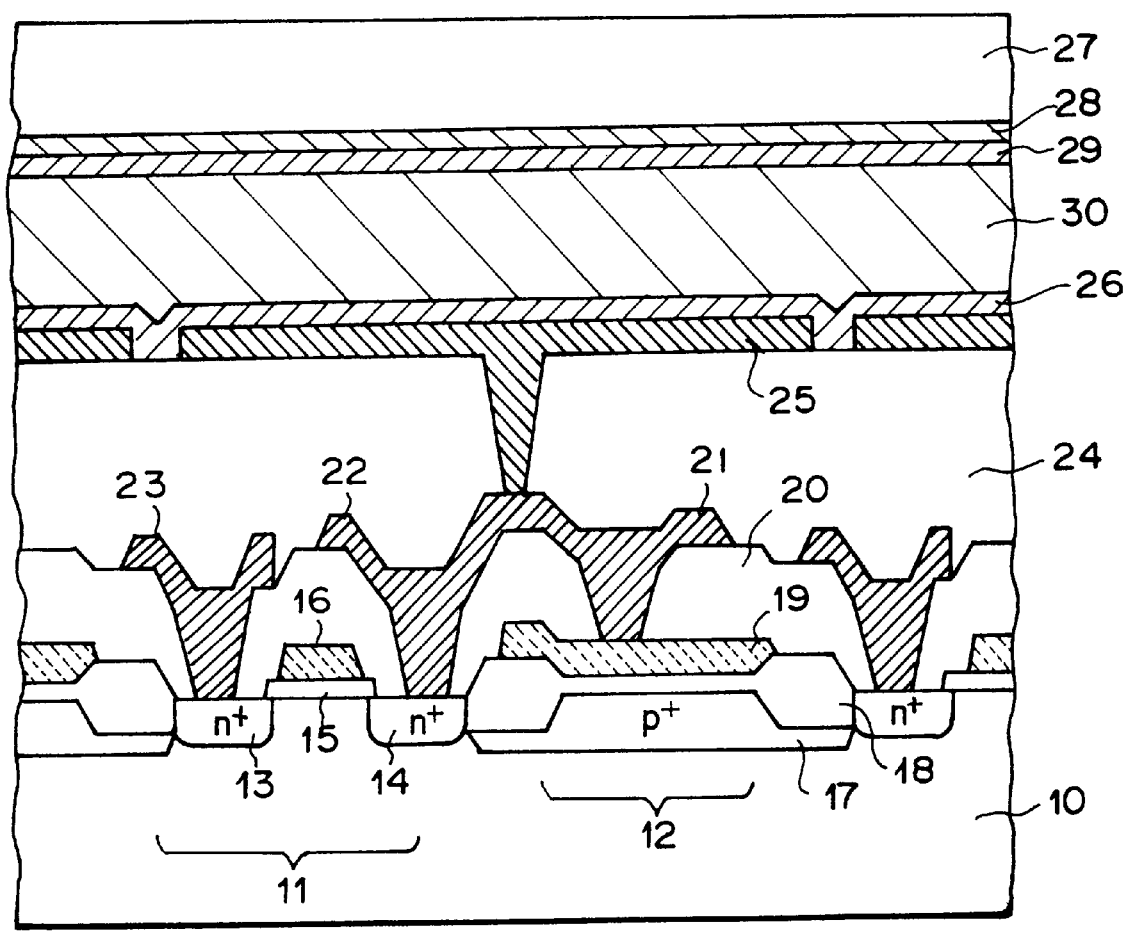
FIG. 1 is a schematic vertical sectional view showing a picture element section of a conventional reflection-type two-dimensional matrix spatial light modulation device.
Figure 2:
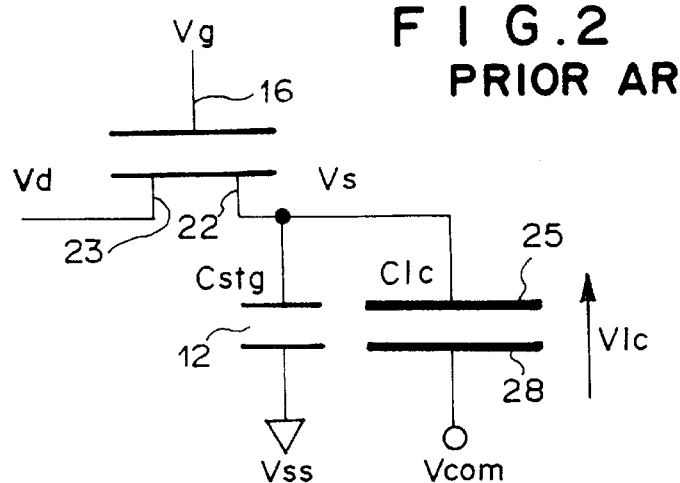
FIG. 2 is a circuit diagram showing a circuit equivalent to the picture element section of the spatial light modulation device shown in FIG. 1.
Figure 3:
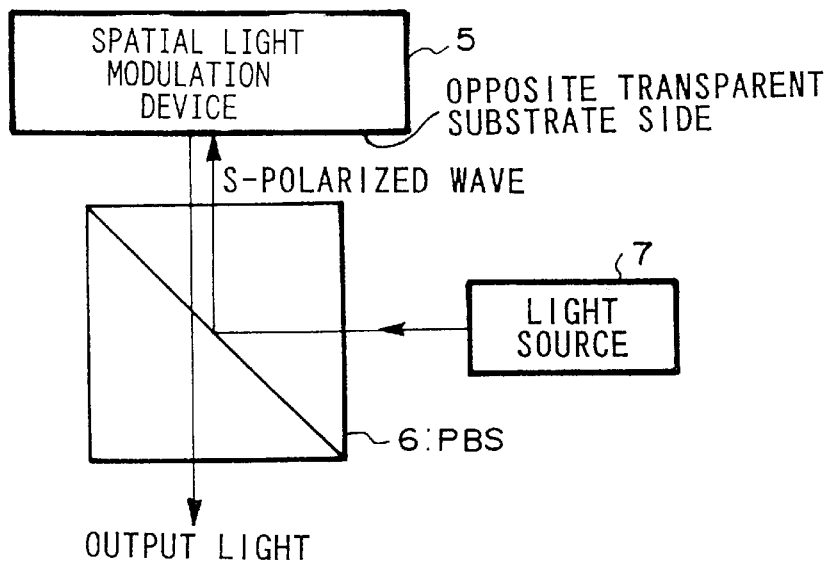
FIG. 3 is a schematic view showing a light modulating optical system utilizing the spatial light modulation device shown in FIG. 1, the view serving as an aid in explaining a fundamental operation of the spatial light modulation device.
Figure 4:
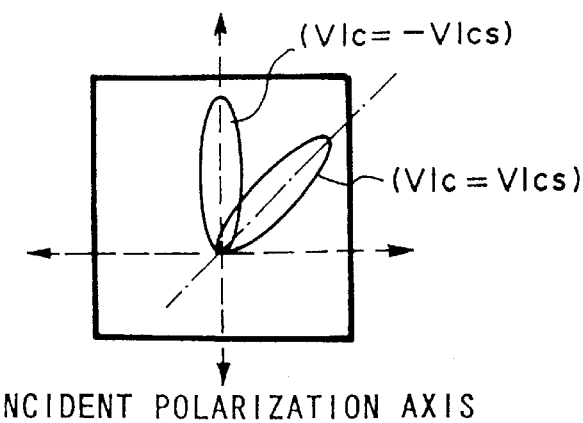
FIG. 4 is an explanatory view showing the relationship between the liquid crystal layer voltage and the position of orientation of the liquid crystal, the view serving as an aid in explaining the fundamental operation of the spatial light modulation device shown in FIG. 1.
Figure 5:
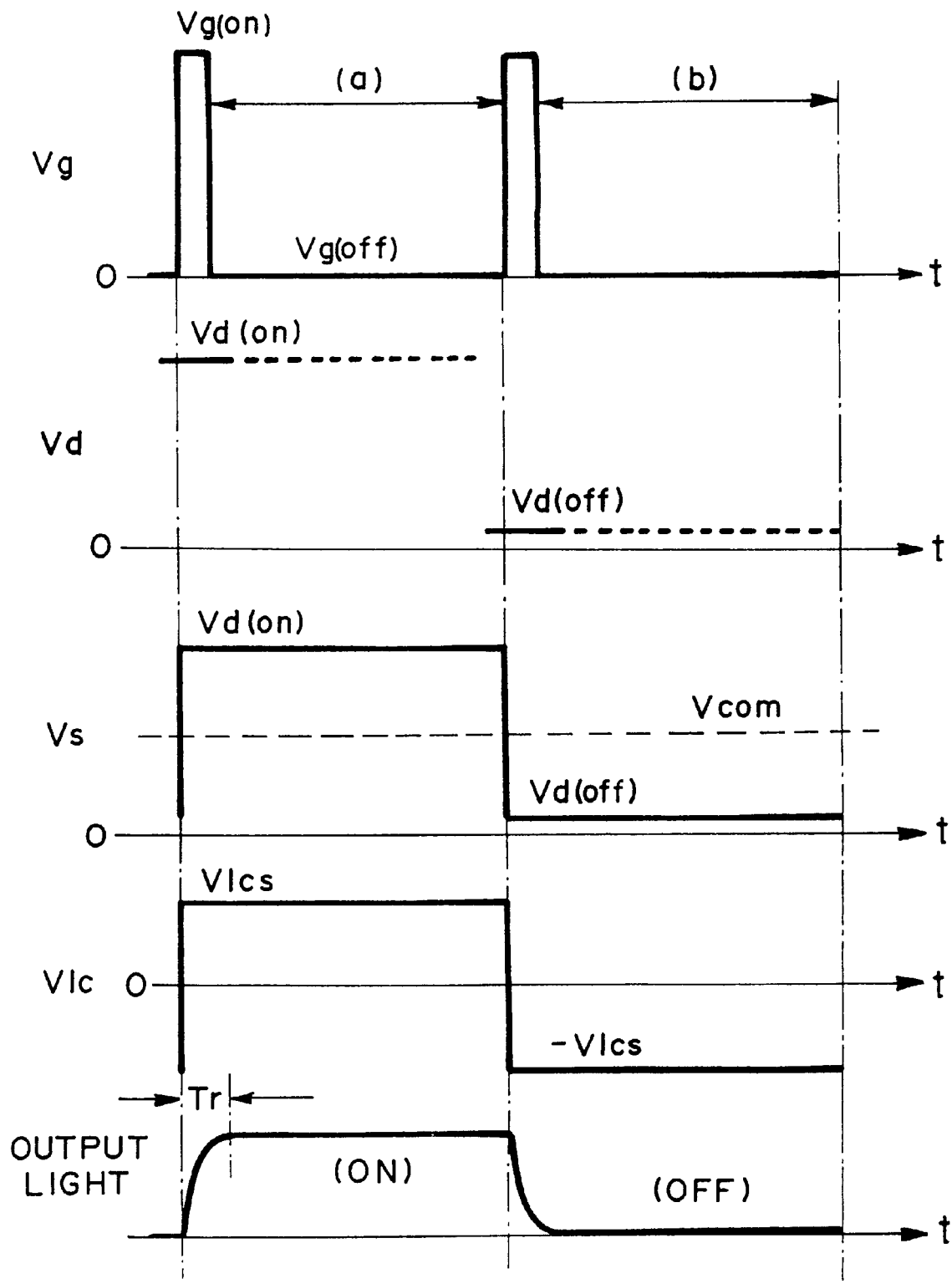
FIG. 5 is a graph showing the voltages at the picture element section of the spatial light modulation device shown in FIG. 1 and the wave form of output light.
Figure 6:
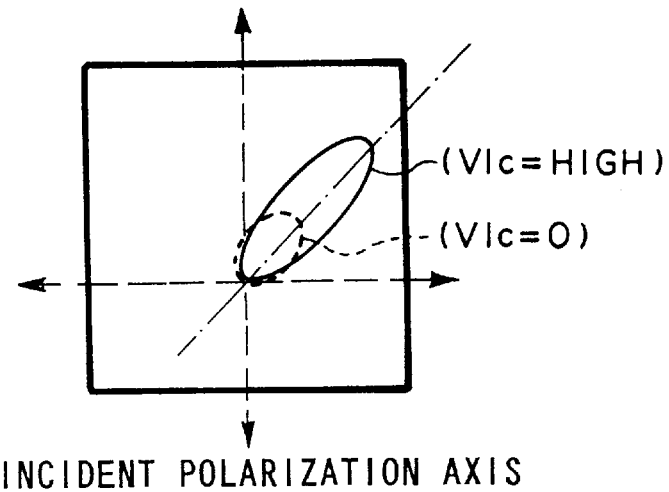
FIG. 6 is a schematic plan view showing a liquid crystal orientation state in an ECB mode liquid crystal layer in accordance with the liquid crystal layer voltage.
Figure 7:
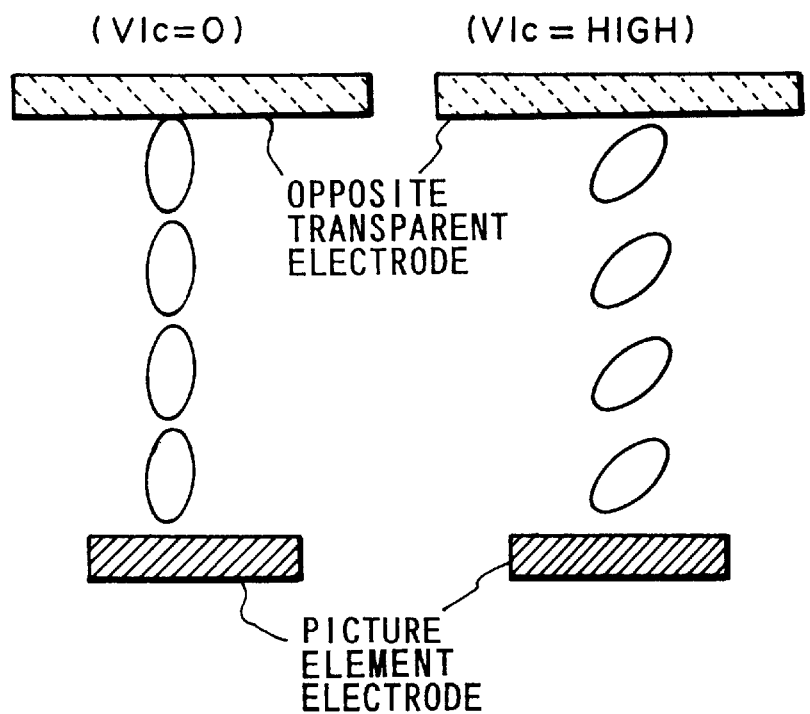
FIG. 7 is a schematic side view showing the liquid crystal orientation state in the ECB mode liquid crystal layer in accordance with the liquid crystal layer voltage.
Figure 8:
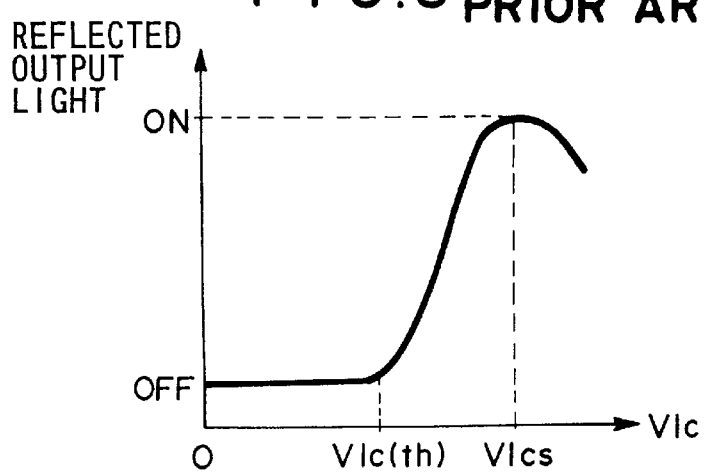
FIG. 8 is a graph showing the relationship between the reflected output light, which is obtained from the ECB mode liquid crystal layer, and the liquid crystal layer voltage.
Figure 9:
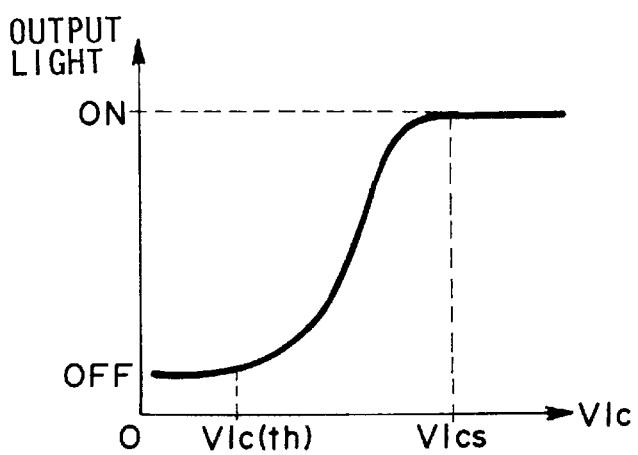
FIG. 9 is a graph showing the relationship between the reflected output light, which is obtained from a polymer-dispersed liquid crystal layer, and the liquid crystal layer voltage.
Figure 10:
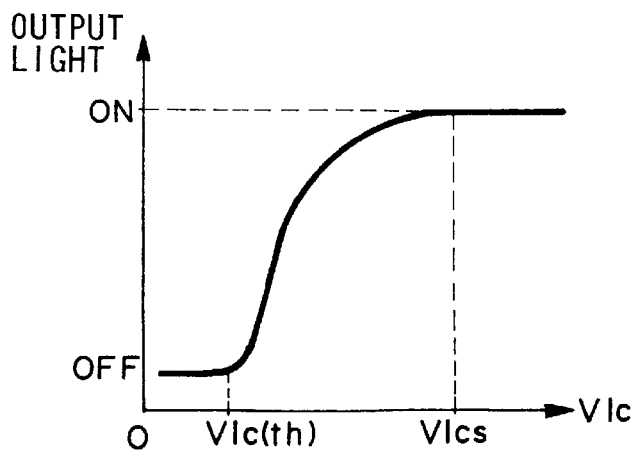
FIG. 10 is a graph showing the relationship between the reflected output light, which is obtained from a positive type of guest host liquid crystal layer, and the liquid crystal layer voltage.
Figure 11:
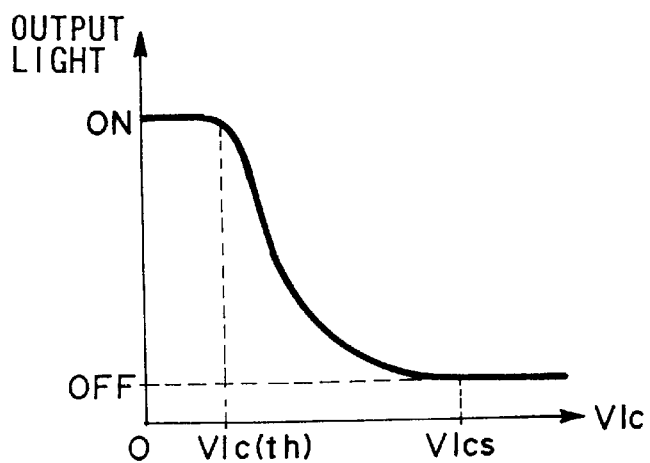
FIG. 11 is a graph showing the relationship between the reflected output light, which is obtained from a negative type of guest host liquid crystal layer, and the liquid crystal layer voltage.
Figure 12:
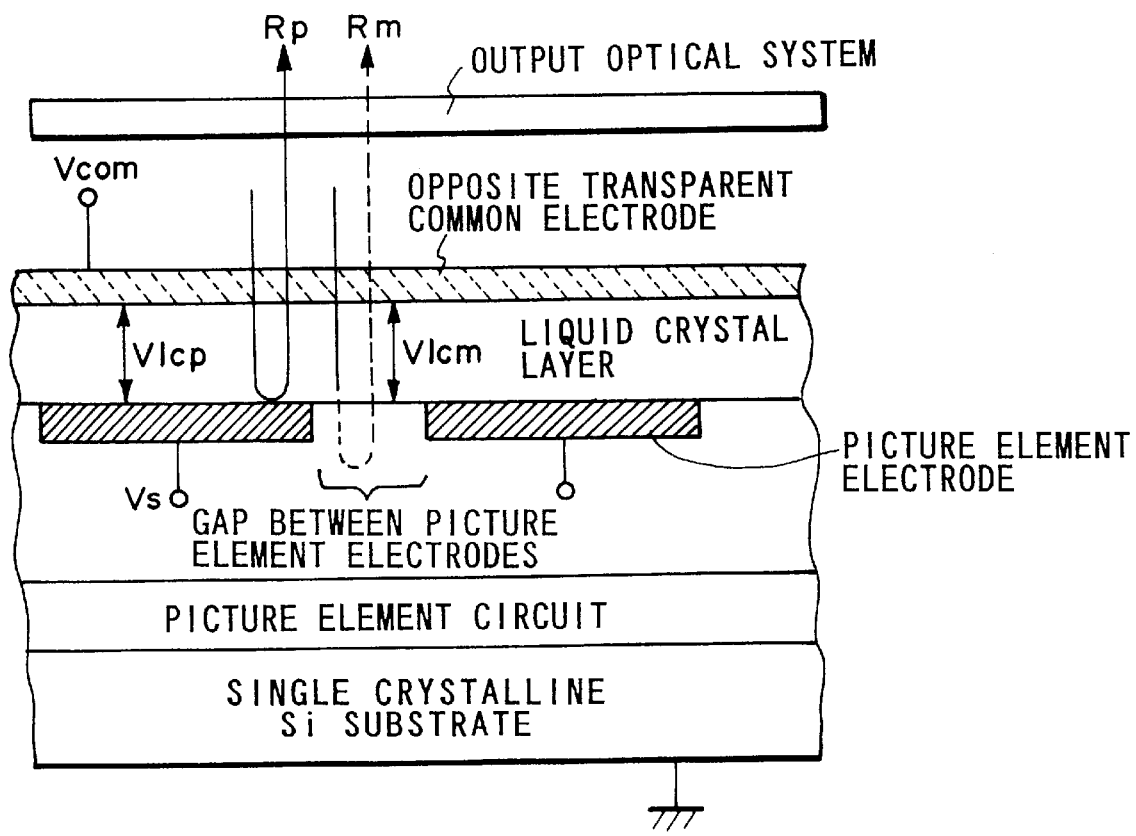
FIG. 12 is an explanatory sectional view showing a region, which stands facing a picture element electrode, and a region, which stands facing a gap between adjacent picture element electrodes, in a conventional reflection-type two-dimensional matrix spatial light modulation device.
Figure 13:
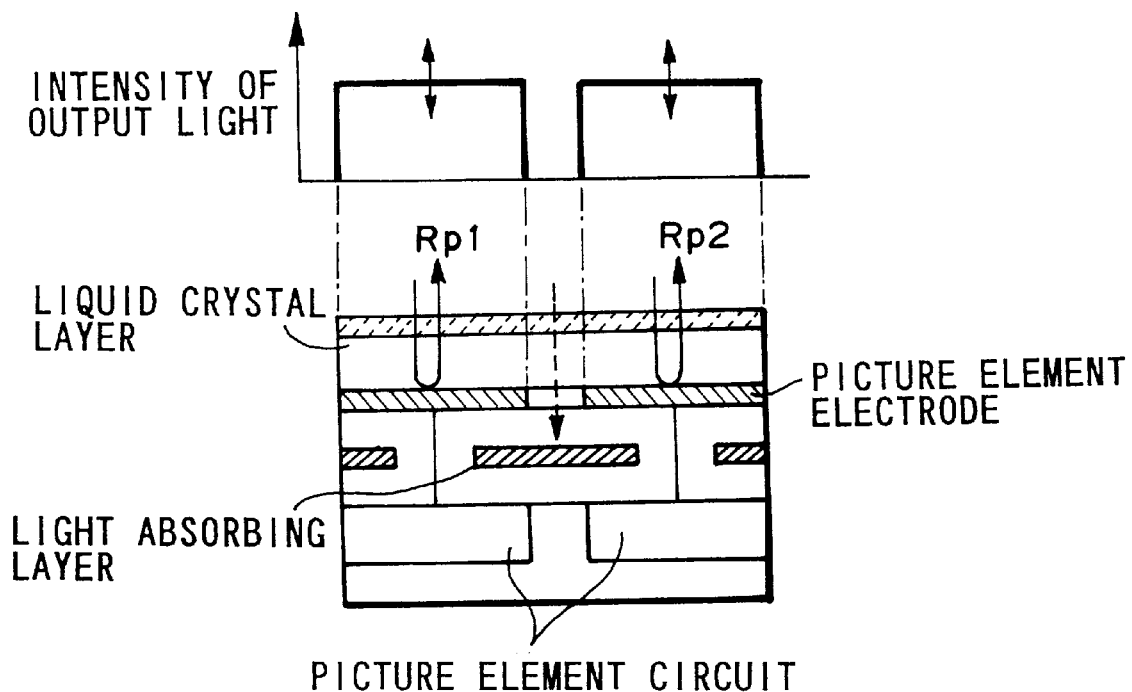
FIG. 13 is a schematic view showing a distribution of intensity of output light obtained from various regions in a conventional reflection-type two-dimensional matrix spatial light modulation device, in which a light blocking layer is a light absorbing layer.
Figure 14:
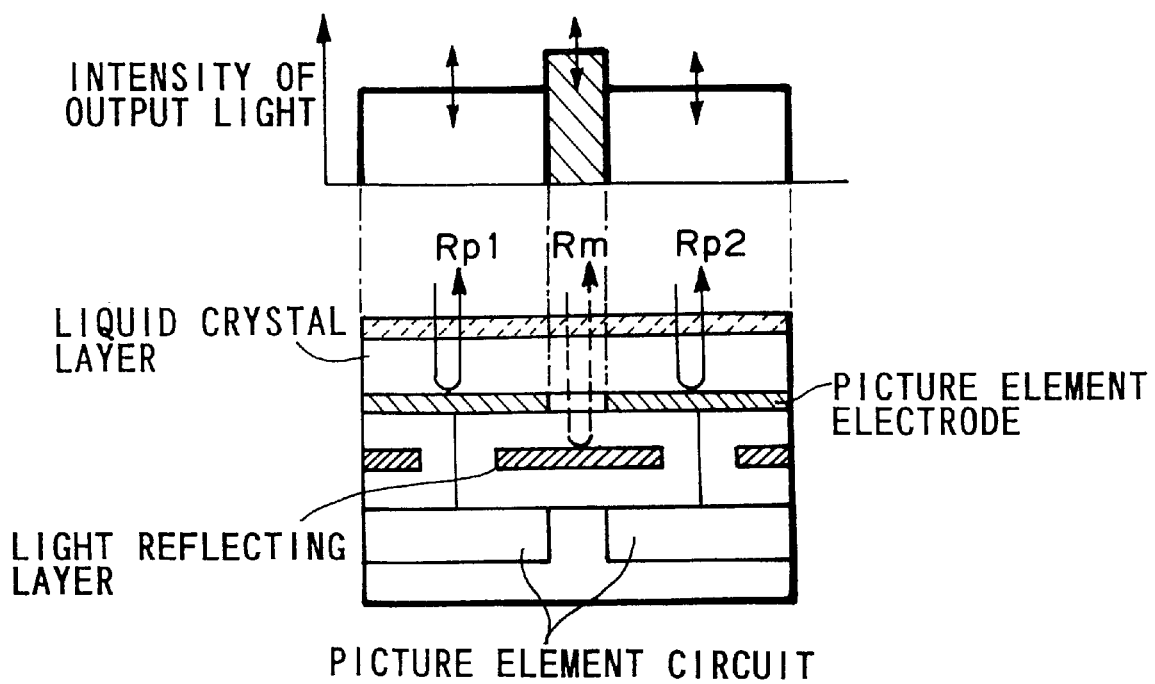
FIG. 14 is a schematic view showing a distribution of intensity of output light obtained from various regions in a different conventional reflection-type two-dimensional matrix spatial light modulation device, in which a light blocking layer is a light reflecting layer.
Figure 15:
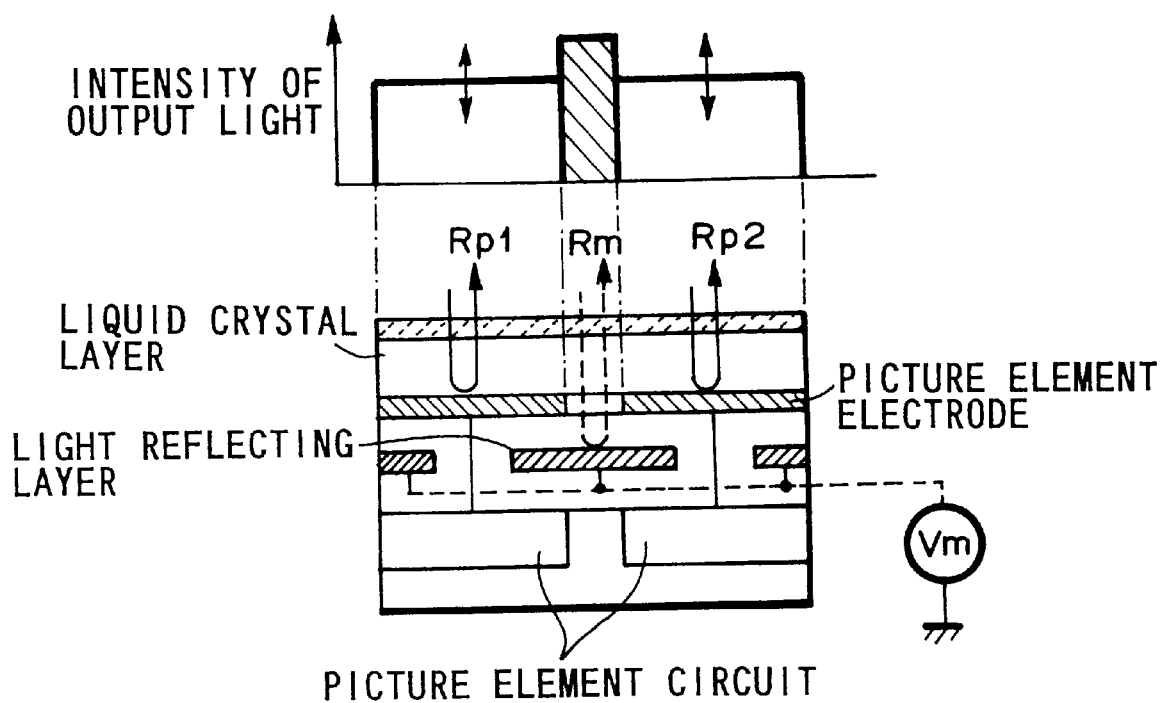
FIG. 15 is a schematic view showing a distribution of intensity of output light obtained from various regions in a further different conventional reflection-type two-dimensional matrix spatial light modulation device, in which electrically conductive light blocking layers are utilized.
Figure 16:
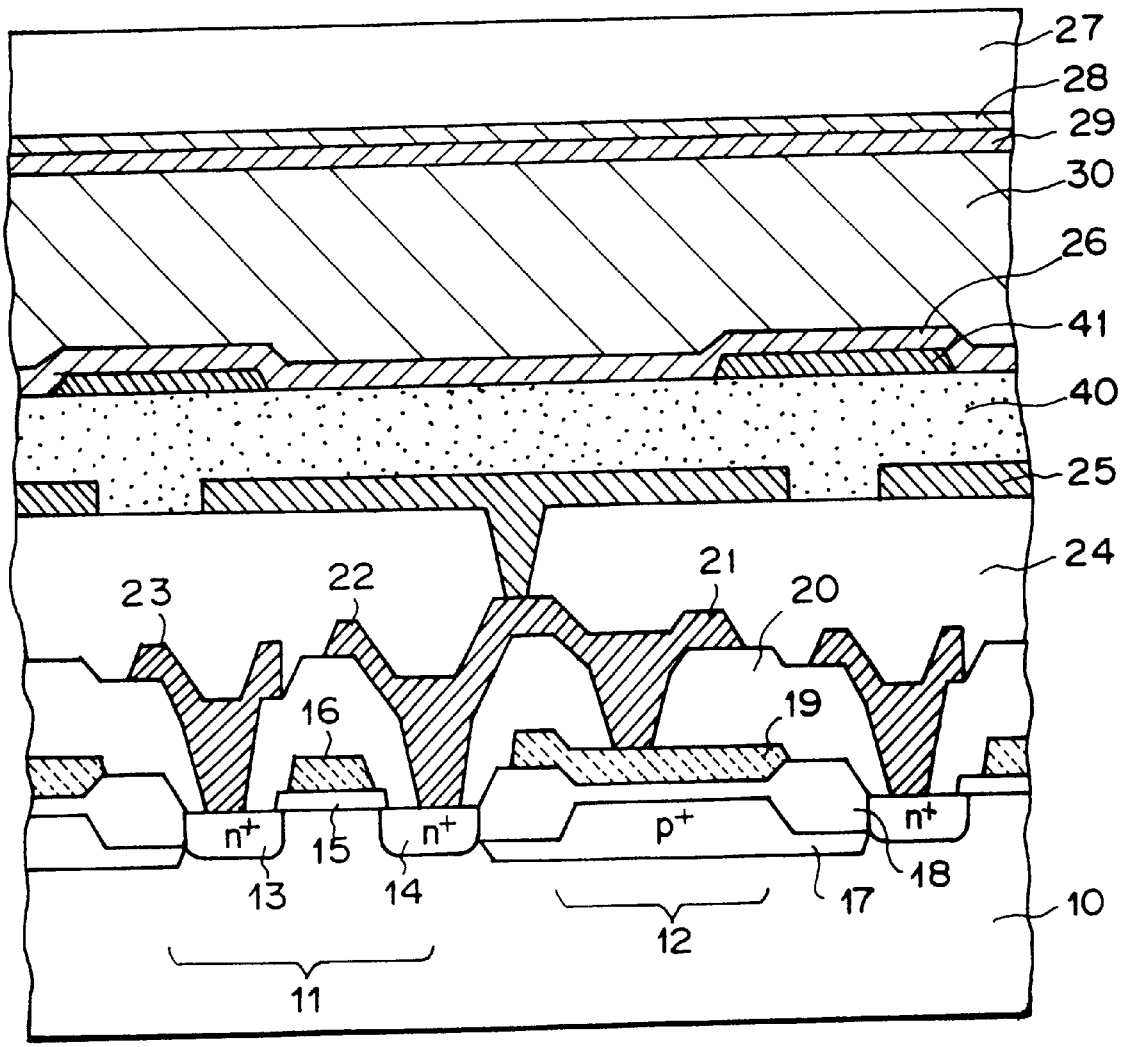
FIG. 16 is a schematic vertical sectional view showing a picture element section in a first embodiment of the reflection-type two-dimensional matrix spatial light modulation device in accordance with the present invention.

FIG. 16 is a schematic vertical sectional view showing a picture element section in a first embodiment of the reflection-type two-dimensional matrix spatial light modulation device in accordance with the present invention. As illustrated in FIG. 16, an n-MOS-FET 11 and a charge storage capacity Cstg 12 are formed on a single crystalline $p^-$-type silicon semiconductor substrate 10. The n-MOS-FET 11 comprises an $n^+$-type drain region 13, an $n^+$-type source region 14, a gate oxide film 15, and a gate electrode 16 constituted of a poly-Si film. The charge storage capacity Cstg 12 comprises a $p^+$ region 17, an oxide film 18, and a poly-Si film 19.

A first-layer Al wiring 21 is formed on the side across a first layer-insulation film 20, and a source electrode 22 connected to the source region 14 is thereby formed. The source region 14 and the poly-Si film 19 of the charge storage capacity Cstg 12 are connected to each other by the source electrode 22. A drain electrode 23 is connected to the drain region 13. Also, a picture element electrode (second-layer Al) 25 is formed on the side across a second layer-insulation film 24 and is connected to the source electrode 22.

A third layer-insulation film 40 is formed on the picture element electrode 25. A picture element gap electrode (third-layer Al) 41, which serves as an electrically conductive film, is formed on the third layer-insulation film 40. The picture element gap electrode 41 covers a gap region between adjacent picture element electrodes 25, 25, which are located under the picture element gap electrode 41 with the third layer-insulation film 40 intervening between the picture element gap electrode 41 and the picture element electrodes 25, 25. Also, the picture element gap electrode 41 is formed such that the portions thereof may overlap with the picture element electrodes 25, 25. An orientation film 26 is formed on the picture element gap electrode 41.

An opposite transparent common electrode 28 constituted of ITO is formed on one side of an opposite transparent substrate 27, and an orientation film 29 is formed on the opposite transparent common electrode 28. The two substrates 10 and 27 are located such that the orientation film 26, which is combined integrally with the substrate 10, and the orientation film 29, which is combined integrally with the substrate 27, may stand facing each other. A ferroelectric liquid crystal 30, which constitutes a light modulation layer, is held between the orientation film 26 and the orientation film 29.

In order for the flatness of the picture element electrode 25 and the picture element gap electrode 41 to be enhanced, as the second layer-insulation film 24 and the third layer-insulation film 40, a flattened film, such as an SOG film, a BPSG reflow film, or a PI film, or a laminated film, which comprises such a flattened film and an insulation characteristics ensuring film, such as a silicon oxide film formed with a plasma-enhanced CVD process, should preferably be employed. Also, a flattening processing with polishing, such as CMP, should preferably be carried out.

Figure 17:
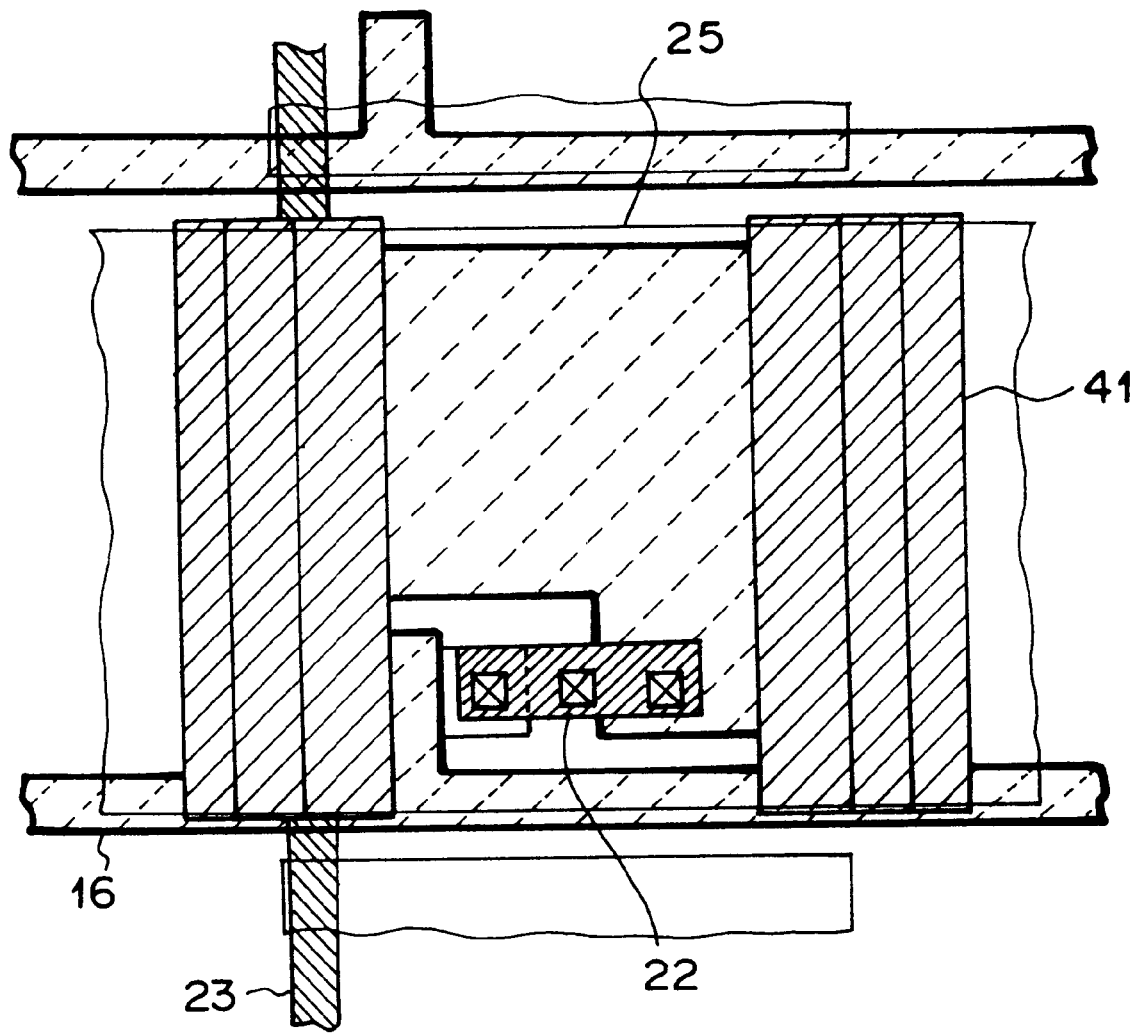
FIG. 17 is a plan view showing the major part of the spatial light modulation device shown in FIG. 16.

FIG. 17 is a plan view showing the major part of the spatial light modulation device shown in FIG. 16.

In this embodiment, the picture element gap electrode 41 covers the gap between two picture element electrodes 25, 25, which are adjacent to each other along the horizontal direction. Also, the right end portion and the left end portion of the picture element gap electrode 41, which have approximately the same areas, overlap respectively with the two picture element electrodes 25, 25. As will be understood from FIG. 16 and FIG. 17, the picture element gap electrodes 41, 41, . . . , which correspond to different sets of two adjacent picture element electrodes 25, 25, are electrically separated from one another. Further, the periphery of each picture element gap electrode 41 is surrounded by the third layer-insulation film 40. Thus the picture element gap electrodes 41, 41, . . . are constituted as floating electrodes, which are not connected by a wiring with an electrically conductive material.

Figure 18:
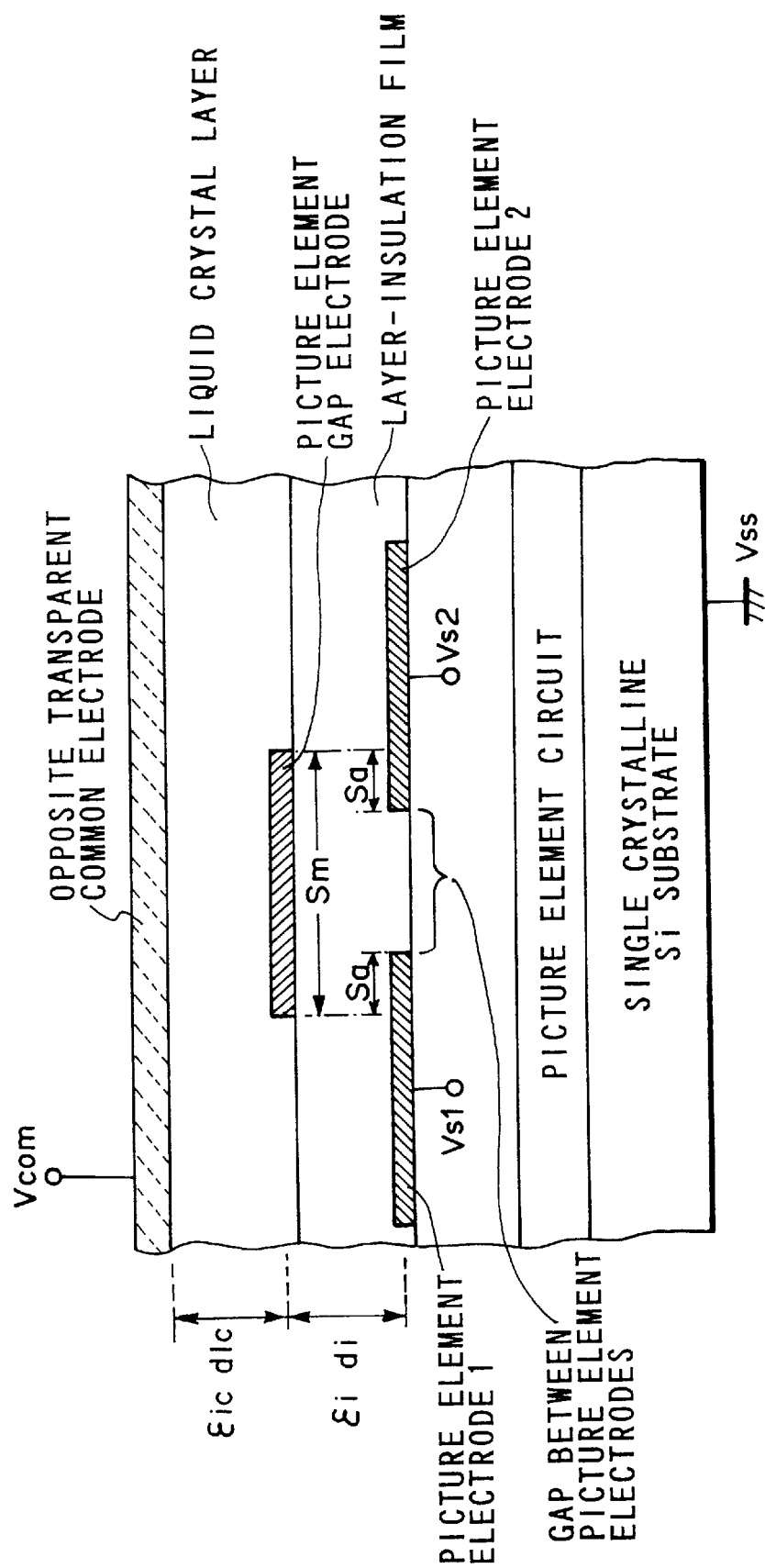
FIG. 18 is an explanatory sectional view showing a region, which stands facing a picture element electrode, and a region, which stands facing a gap between adjacent picture element electrodes, in the spatial light modulation device shown in FIG. 16.

How the spatial light modulation device having the constitution described above operates will be described hereinbelow. FIG. 18 is an explanatory sectional view showing a region, which stands facing a picture element electrode, and a region, which stands facing a gap between adjacent picture element electrodes, in the spatial light modulation device shown in FIG. 16. As illustrated in FIG. 18, two adjacent picture element electrodes (i.e., a picture element electrode 1 and a picture element electrode 2) are connected respectively to the corresponding picture element circuits. The layer-insulation film is formed on the picture element electrodes, and the picture element gap electrode (i.e., the electrically conductive film) is formed on the two picture element electrodes such that it may cover the gap between the two picture element electrodes. The opposite transparent common electrode is located on the picture element gap electrode with the liquid crystal layer intervening therebetween. The potential of the opposite transparent common electrode is represented by Vcom.

The picture element gap electrode 41 is not electrically connected to anything and is thus constituted as the floating electrode. The voltage of the picture element electrode 1, which is taken with respect to the potential Vcom, is represented by Vs1. The voltage of the picture element electrode 2, which is taken with respect to the potential Vcom, is represented by Vs2. The film thickness and the relative dielectric constant of the layer-insulation film are represented respectively by di and $\epsilon i$. The layer thickness and the relative dielectric constant of the liquid crystal layer are represented respectively by dlc and $\epsilon lc$. In the strict sense, the relative dielectric constant of the liquid crystal layer varies in accordance with the state of orientation of the liquid crystal. However, it is herein considered that effects of the variation in the relative dielectric constant of the liquid crystal layer upon the operation and the effects of the spatial light modulation device in accordance with the present invention will be small, and $\epsilon lc$ is taken as a mean-level value. The area of the picture element gap electrode is represented by Sm. Each of the area of the portion of the picture element gap electrode, which portion overlaps with the picture element electrode 1, and the area of the portion of the picture element gap electrode, which portion overlaps with the picture element electrode 2, is represented by Sa.

Figure 19:
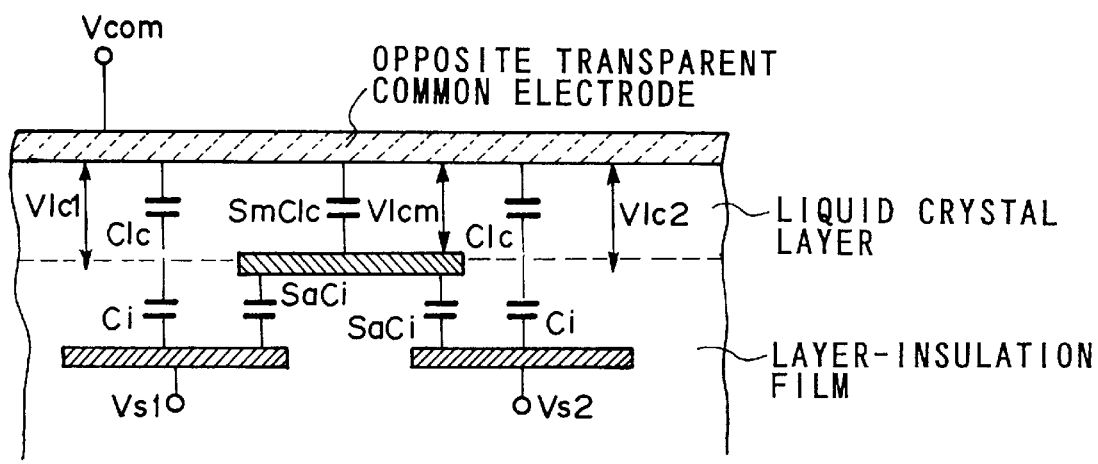
FIG. 19 is an explanatory view showing a capacity distribution in the constitution of FIG. 18.

FIG. 19 is an explanatory view showing a capacity distribution in the constitution of FIG. 18. With reference to FIG. 19, the capacity per unit area of the layer-insulation film and the capacity per unit area of the liquid crystal layer are represented respectively by Ci and Clc. In such cases, the capacity, which is constituted by the entire region of the picture element gap electrode and the opposite transparent common electrode, may be represented by SmClc. The capacity of the region, at which the picture element gap electrode and the picture element electrode 1 overlap each other, may be represented by SaCi. Also, the capacity of the region, at which the picture element gap electrode and the picture element electrode 2 overlap each other, may be represented by SaCi.

The liquid crystal layer voltage at the region located on the portion of the picture element electrode 1, which portion is not covered by the picture element gap electrode, is represented by Vlc1. The liquid crystal layer voltage at the region located on the portion of the picture element electrode 2, which portion is not covered by the picture element gap electrode, is represented by Vlc2. Also, the liquid crystal layer voltage at the region located on the picture element gap electrode is represented by Vlcm. In such cases, the respective voltages may be represented by Formulas (1), (2), and (3) shown below.

$$Vlc1 = \frac{Ci}{Clc + Ci} Vs1 \quad (1)$$

$$Vlc2 = \frac{Ci}{Clc + Ci} Vs2 \quad (2)$$

$$Vlcm = \frac{SaCi}{SmClc + 2 SaCi} (Vs1 + Vs2) \quad (3)$$

From Formulas (1), (2), and (3) shown above, the relationship among Vlcm, Vlc1, and Vlc2 may be represented by Formula (4) shown below.

$$Vlcm = \frac{Sa(Clc + Ci)}{SmClc + 2 SaCi} (Vlc1 + Vlc2) \quad (4)$$

If the permittivity of vacuum is represented by $\epsilon_0$, Ci and Clc may be represented by Formulas (5) and (6) shown below.

$$Ci = \frac{\epsilon_0 \epsilon_i}{di} \quad (5)$$

$$Clc = \frac{\epsilon_0 \epsilon_{lc}}{dlc} \quad (6)$$

Figure 20:
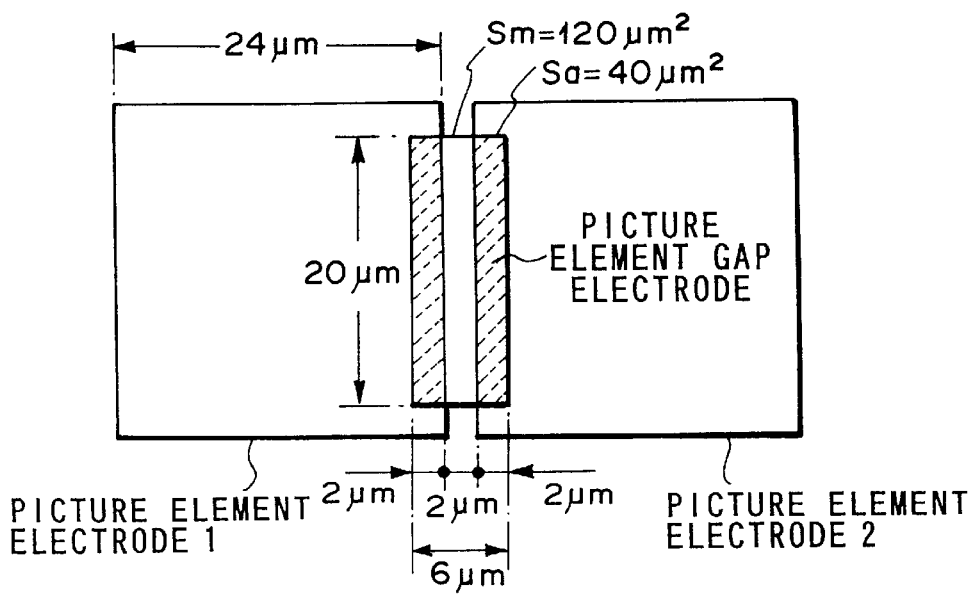
FIG. 20 is a schematic plan view showing the picture element section of the spatial light modulation device shown in FIG. 16.
Figure 21:
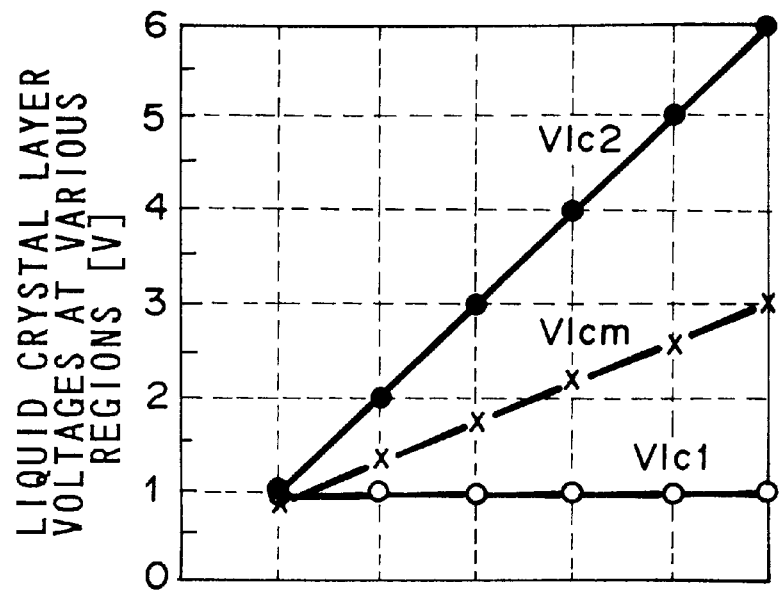
FIG. 21 is a graph showing examples of liquid crystal layer voltages at various regions in the spatial light modulation device shown in FIG. 16.
Figure 22:
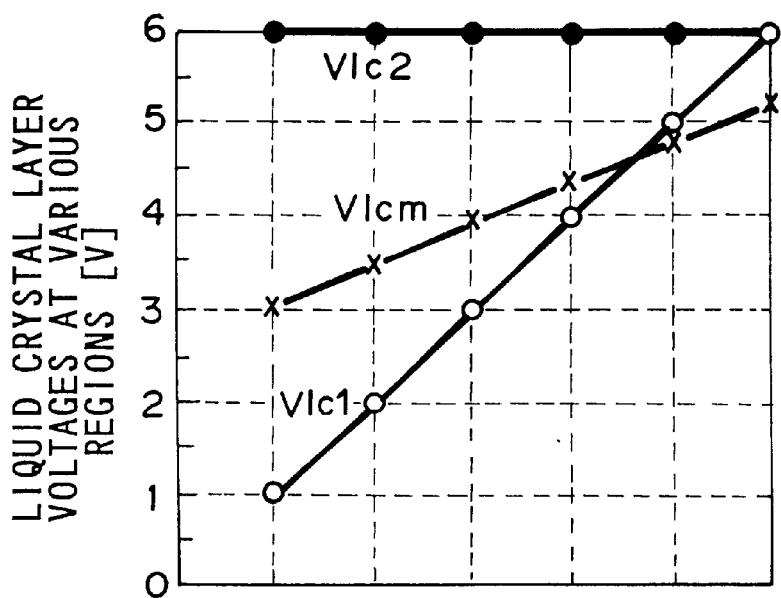
FIG. 22 is a graph showing different examples of liquid crystal layer voltages at various regions in the spatial light modulation device shown in FIG. 16.

The relationship among Vlcm, Vlc1, and Vlc2 was calculated by substituting physical property values in concrete constitution examples into Formulas (4), (5), and (6) shown above. FIG. 20 is a schematic plan view showing the picture element section in the first embodiment shown in FIG. 16. FIG. 21 and FIG. 22 are graphs showing examples of liquid crystal layer voltages at the regions located on the picture element electrode 1, the picture element electrode 2, and the picture element gap electrode in the first embodiment shown in FIG. 16. FIG. 21 shows the change characteristics of Vlcm, which are obtained when Vlc1 is kept constant at 1V and Vlc2 is changed between 1V and 6V. FIG. 22 shows the change characteristics of Vlcm, which are obtained when Vlc2 is kept constant at 6V and Vlc1 is changed between 1V and 6V.

Also, in this embodiment, the layer-insulation film is constituted of an $SiO_2$ film, its relative dielectric constant $\epsilon i$ is equal to 4, and its film thickness di is equal to 2 $\mu$m. The relative dielectric constant $\epsilon lc$ of the liquid crystal layer is equal to 5, and its layer thickness dlc is equal to 6 $\mu$m.

As is clear from FIG. 21 and FIG. 22, with respect to almost all of the various combinations of the liquid crystal layer voltages Vlc1 and Vlc2 at the adjacent picture elements, Vlcm takes a value falling between the liquid crystal layer voltages Vlc1 and Vlc2. Therefore, the intensity of the modulated output light, which is reflected from the picture element gap electrode, takes a value falling between the intensity of the modulated output light, which is obtained from the region located on the picture element electrode 1, and the intensity of the modulated output light, which is obtained from the region located on the picture element electrode 2. Accordingly, while the image quality obtained with the output light is being kept good, the incident light at the region facing the gap between the adjacent picture elements, which light has heretofore been ineffective, can be utilized efficiently, and the amount of the output light as a whole can be kept large. Also, since the light entering through the region, which faces the gap between the adjacent picture elements, into the interior can be reduced markedly, the occurrence of the problems with regard to the variation in picture element potential due to incidence of light upon the picture element circuits can be reduced markedly.

<Second embodiment>

A second embodiment of the spatial light modulation device in accordance with the present invention, wherein larger effects than with the aforesaid first embodiment can be obtained, will be described hereinbelow. Formula (4) shown above can be modified into Formula (7) shown below.

$$Vlcm = \frac{B+1}{AB+2}(Vlc1 + Vlc2) \qquad (7)$$

wherein $$A = \frac{Sm}{Sa} \qquad (8)$$

$$B = \frac{Clc}{Ci} \qquad (9)$$

From Formulas (7), (8), and (9), it is found that, when the value of B is set at a small value, Vlcm becomes close to ½ (Vlc1+Vlc2). Also, when the value of A is set at a value close to 2, Vlcm becomes close to ½ (Vlc1+Vlc2). Specifically, in order to render Vlcm close to ½ (Vlc1+Vlc2), one of the techniques described below may be employed.

a) A technique, in which Ci is set to be large with respect to Clc.
b) A technique, in which Sa is set to be large with respect to Sm.

In the technique described in (a), ordinarily, it is easier to change Ci than to change Clc. For such purposes, the film thickness di of the layer-insulation film may be set to be thin, or a material having a large dielectric constant may be used for the layer-insulation film. In the technique described in (b), the proportion occupied by the overlapping portion of the picture element gap electrode may be set to be large.

Figure 23:
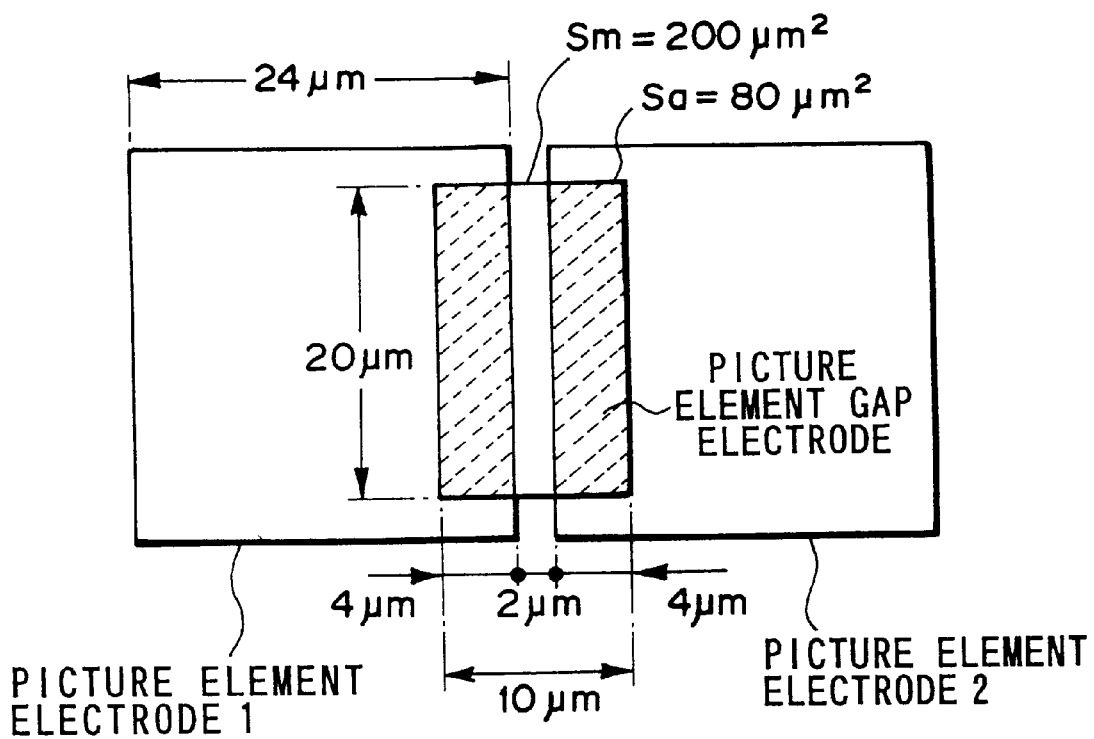
FIG. 23 is a schematic plan view showing a picture element section in a second embodiment of the spatial light modulation device in accordance with the present invention.
Figure 24:
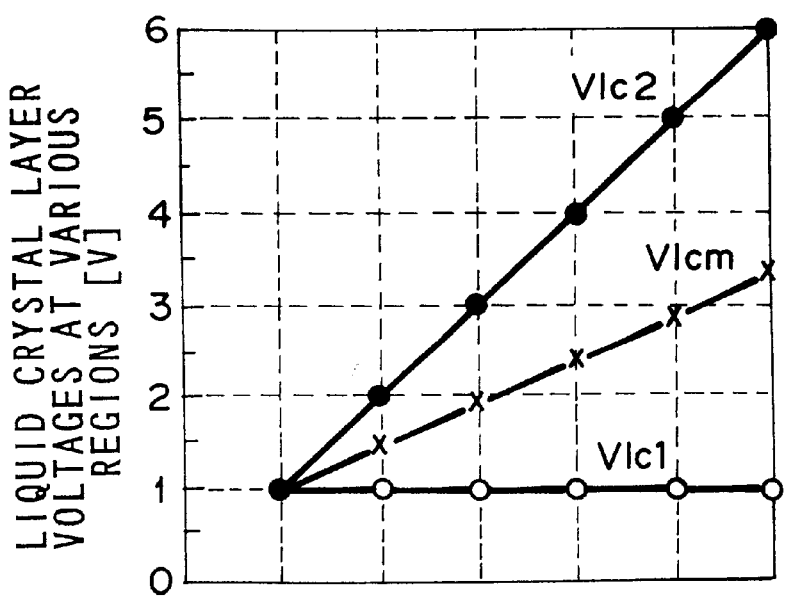
FIG. 24 is a graph showing examples of liquid crystal layer voltages at various regions in the spatial light modulation device shown in FIG. 23.
Figure 25:
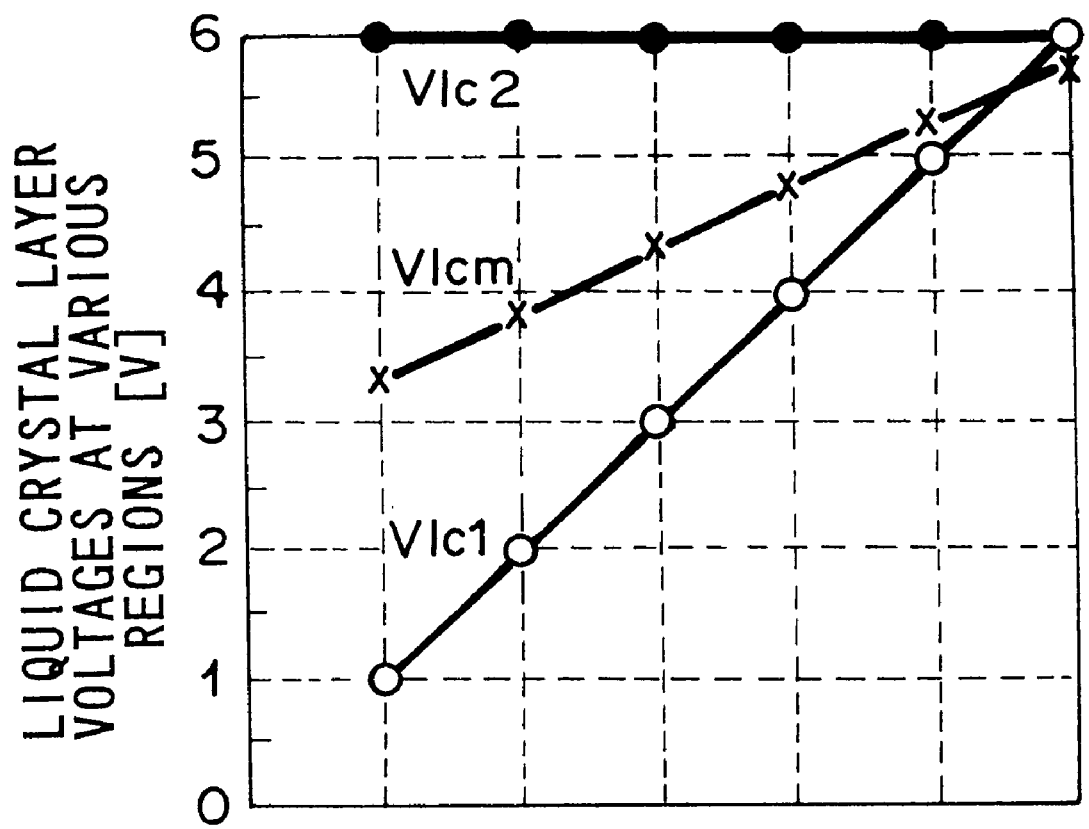
FIG. 25 is a graph showing different examples of liquid crystal layer voltages at various regions in the spatial light modulation device shown in FIG. 23.

FIG. 23 is a schematic plan view showing a picture element section in the second embodiment, wherein the effects are enhanced from the point of view described above. FIG. 24 and FIG. 25 are graphs showing examples of liquid crystal layer voltages at various regions in the spatial light modulation device shown in FIG. 23. FIG. 24 shows the change characteristics of Vlcm, which are obtained when Vlc1 is kept constant at 1V and Vlc2 is changed between 1V and 6V. FIG. 25 shows the change characteristics of Vlcm, which are obtained when Vlc2 is kept constant at 6V and Vlc1 is changed between 1V and 6V.

The second embodiment is different from the first embodiment in that the proportion occupied by the overlapping portion of the picture element gap electrode is set to be larger than in the first embodiment, and in that the film thickness di of the layer-insulation film is set to be thinner than in the first embodiment. Also, the layer-insulation film is constituted of an $SiO_2$ film, its relative dielectric constant $\epsilon i$ is equal to 4, and its film thickness di is equal to 1 $\mu$m. The relative dielectric constant $\epsilon lc$ of the liquid crystal layer is equal to 5, and its layer thickness dlc is equal to 6 $\mu$m.

As is clear from FIG. 24 and FIG. 25, Vlcm takes an approximately intermediate value between the liquid crystal layer voltages Vlc1 and Vlc2 at the adjacent picture elements. Even though the area of the picture element gap electrode becomes large, the output light having an approximately intermediate intensity between the intensities of the output light obtained from the adjacent picture elements can be obtained from the picture element gap electrode. Therefore, by virtue of the effects of interpolation from the adjacent picture elements, smooth image quality can be obtained. Also, the light utilization efficiency, expressed in terms of the reflection area percentage, can be kept as high as approximately 100%.

Figure 26:
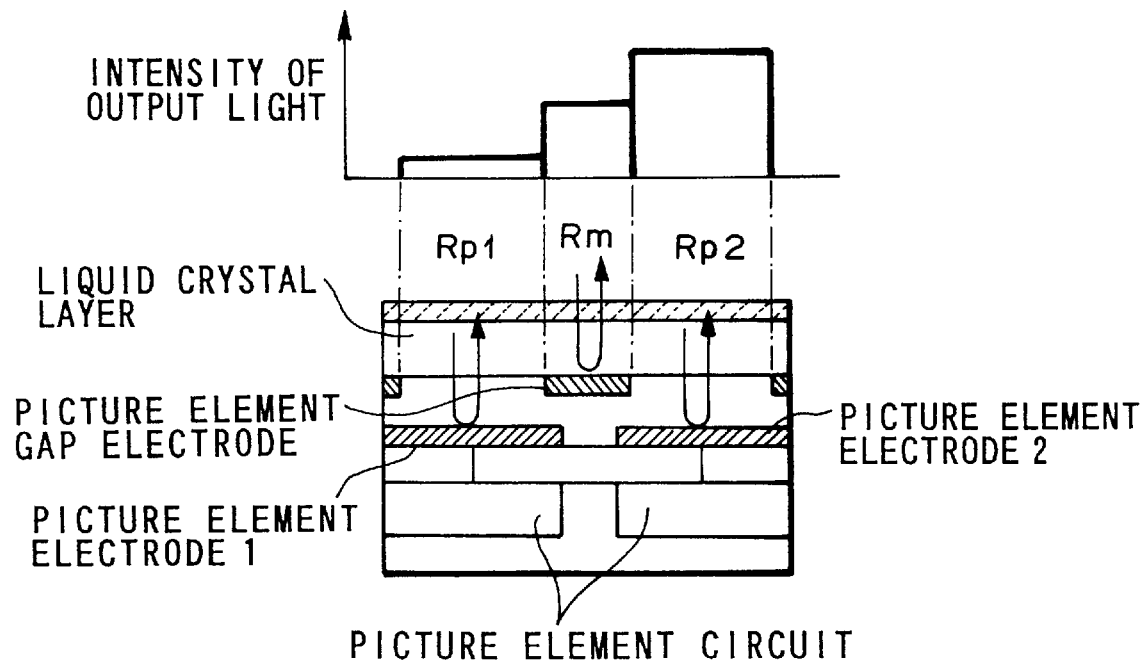
FIG. 26 is an explanatory view showing output light intensities, which are obtained when voltages of adjacent picture elements are different from each other in the spatial light modulation device shown in FIG. 23.
Figure 27:
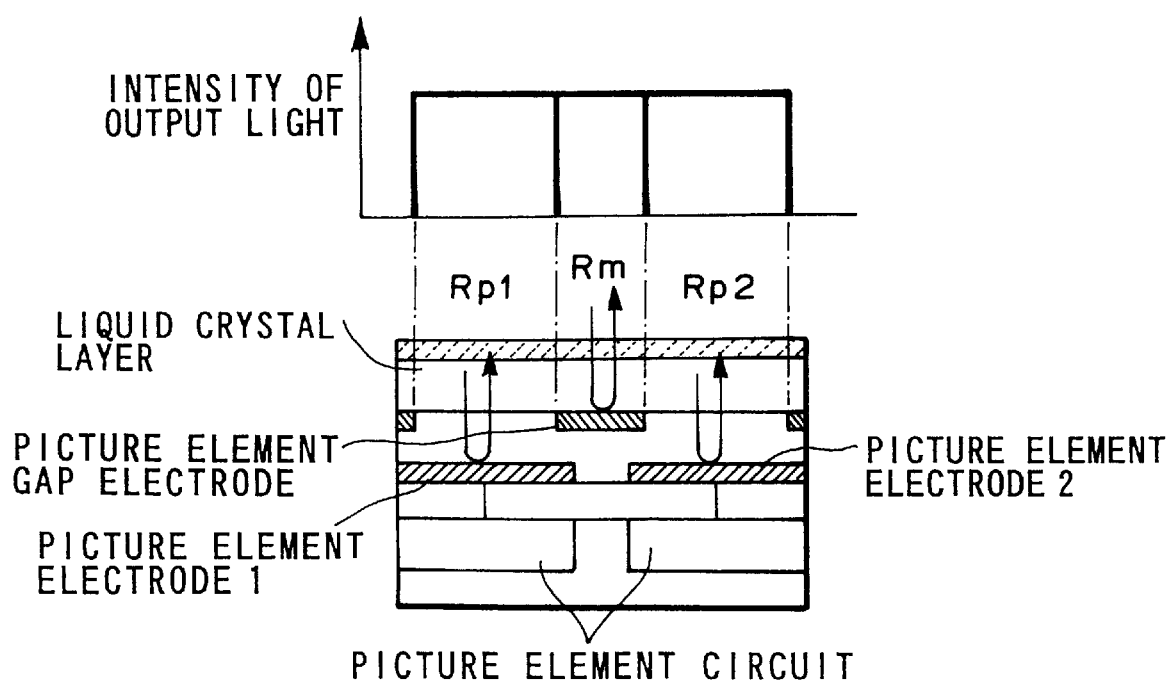
FIG. 27 is an explanatory view showing output light intensities, which are obtained when voltages of adjacent picture elements are equal to each other in the spatial light modulation device shown in FIG. 23.

FIG. 26 schematically shows the distribution of output light intensities, which are obtained when the picture element voltages with the picture element electrode 1 and the picture element electrode 2 are different from each other in the second embodiment of FIG. 23. FIG. 27 schematically shows the distribution of output light intensities, which are obtained when the picture element voltages with the picture element electrode 1 and the picture element electrode 2 are equal to each other in the second embodiment of FIG. 23.

Besides the constitution described above, the same effects can also be obtained in cases where the picture element gap electrode is formed such that it may overlap with three or more adjacent picture element electrodes. In the first and second embodiments described above, the areas of the portions of the two adjacent picture element electrodes, which portions overlap with the picture element gap electrode, are equal to each other. Alternatively, the ratio of the areas of the overlapping portions may be changed. In such cases, the value of Vlcm becomes close to the voltage of the picture element, which has a larger area of the overlap with the picture element gap electrode than that of the other picture element.

<Third embodiment>

Figure 28:
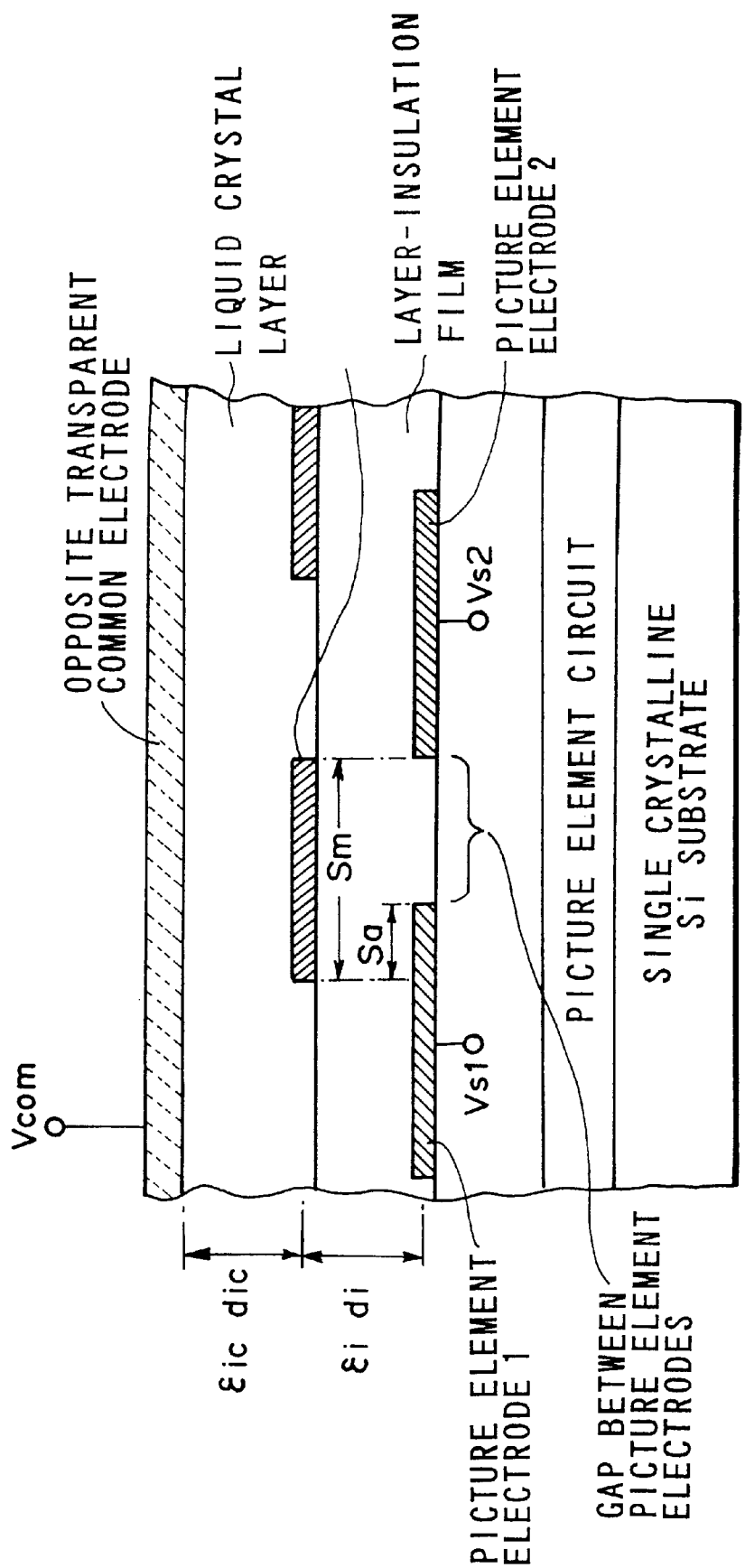
FIG. 28 is an explanatory sectional view showing a region, which stands facing a picture element electrode, and a region, which stands facing a gap between adjacent picture element electrodes, in a third embodiment of the spatial light modulation device in accordance with the present invention.
Figure 29:
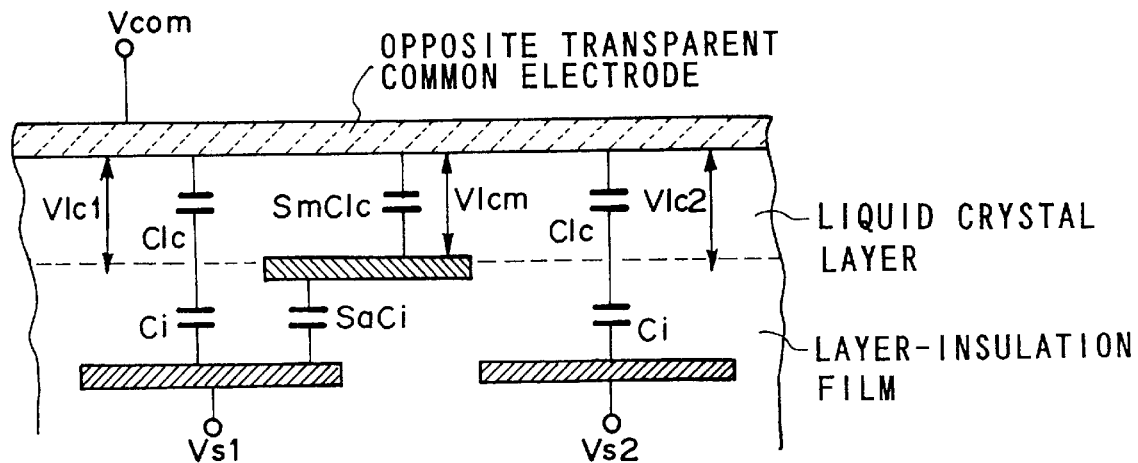
FIG. 29 is an explanatory view showing a capacity distribution in the constitution of FIG. 28.

FIG. 28 is an explanatory sectional view showing a region, which stands facing a picture element electrode, and a region, which stands facing a gap between adjacent picture element electrodes, in a third embodiment of the spatial light modulation device in accordance with the present invention. FIG. 29 is an explanatory view showing a capacity distribution in the constitution of FIG. 28. In this embodiment, the picture element gap electrode overlaps with only one picture element electrode (i.e., only the picture element electrode 1 shown in FIG. 28). In such cases, Formulas (10) and (11) shown below obtain.

$$Vlc1 = \frac{Ci}{Clc + Ci} Vs1 \qquad (10)$$

$$Vlcm = \frac{SaCi}{SmClc + SaCi} Vs1 \qquad (11)$$

From Formulas (10) and (11) shown above, the relationship between Vlcm and Vlc1 may be represented by Formula (12) shown below.

$$Vlcm = \frac{Sa(Clc + Ci)}{SmClc + SaCi} Vs1 \qquad (12)$$

Figure 30:
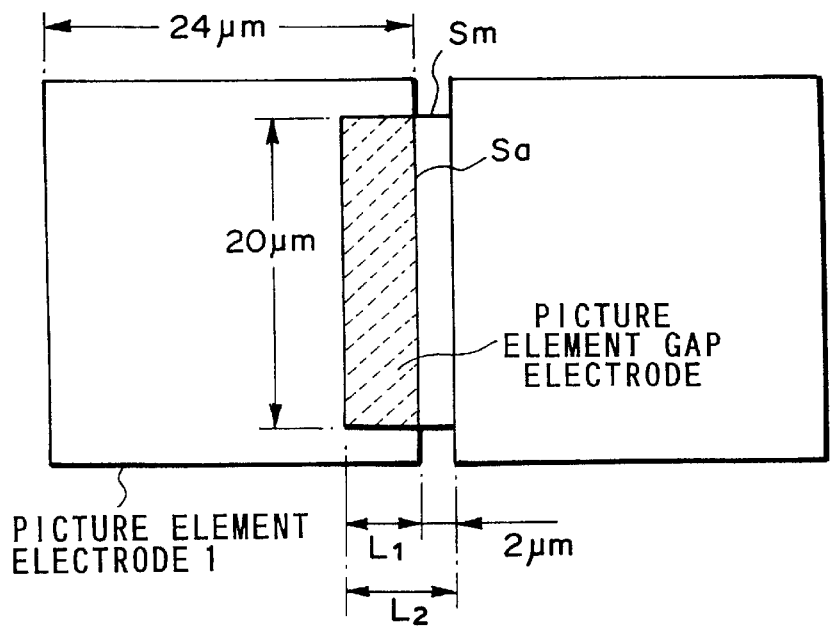
FIG. 30 is a schematic plan view showing the picture element section of the spatial light modulation device shown in FIG. 28.

The relationship between Vlcm and Vlc1 was calculated by substituting physical property values in concrete constitution examples into Formulas (5), (6), and (12) shown above. FIG. 30 is a schematic plan view showing the picture element section in the third embodiment shown in FIG. 28. FIG. 31 is a graph showing the relationship between the liquid crystal layer voltage at the region, which is located on the picture element electrode, and the liquid crystal layer voltage at the region, which faces the gap between the adjacent picture elements, in the third embodiment shown in FIG. 28. In this embodiment, the layer-insulation film is constituted of an $SiO_2$ film, its relative dielectric constant $\epsilon i$ is equal to 4, and its film thickness di is equal to 1 $\mu$m. The relative dielectric constant $\epsilon lc$ of the liquid crystal layer is equal to 5, and its layer thickness dlc is equal to 6 $\mu$m. As the conditions, the values of Sa and Sm were set at three combinations such that (Sa, Sm)=(120, 160), (80, 120), and (40, 80) [in units of $\mu m^2$]. Also, the overlap length L1, over which the picture element electrode and the picture element gap electrode overlap each other, and the length L2 of the picture element gap electrode are set such that (L1, L2)=(6, 8) [in units of $\mu m$] in the cases of (Sa, Sm)=(120, 160), (L1, L2)=(4, 6) [in units of $\mu m$] in the cases of (Sa, Sm)=(80, 120), and (L1, L2)=(2, 4) [in units of $\mu m$] in the cases of (Sa, Sm)=(40, 80).

As illustrated in FIG. 31, in cases where Sa is equal to at least 80 $\mu m^2$ and Sm is equal to at least 120 $m^2$, Vlcm is approximately equal to Vlc1 (equal to at least 90% of Vlc1), and it is considered that the functions of the region located on the picture element gap electrode are identical with the functions of the region located on the picture element electrode 1. Therefore, with this embodiment, good image quality can be obtained, and the light utilization efficiency can be enhanced.

<Fourth embodiment>

FIG. 32 is a schematic plan view showing how picture element electrodes and picture element gap electrodes are located in a fourth embodiment of the spatial light modulation device in accordance with the present invention. In this embodiment, the picture element gap electrode 41, which is located on the gap between the two picture element electrodes 25, 25 that are adjacent to each other along the transverse direction in FIG. 32, overlaps with the two adjacent picture element electrodes 25, 25. Also, the picture element gap electrode 41, which is located on the gap between the two picture element electrodes 25, 25 that are adjacent to each other along the vertical direction in FIG. 32, overlaps with only one of the two adjacent picture element electrodes 25, 25.

In such cases, the liquid crystal layer voltage at the region located on the picture element gap electrode 41, which is located on the gap between the two picture element electrodes 25, 25 that are adjacent to each other along the transverse direction, takes an approximately intermediate value between the values at the two adjacent picture elements. Also, the liquid crystal layer voltage at the region located on the picture element gap electrode 41, which is located on the gap between the two picture element electrodes 25, 25 that are adjacent to each other along the vertical direction, takes a value approximately equal to the liquid crystal layer voltage at the region, which is located on the picture element electrode 25 that has the overlapping portion.

The picture element gap electrode, which overlaps with the two picture element electrodes, should preferably be located on the gap between the picture element electrodes, which are selected by a single same row selecting signal. This is because, if the picture element gap electrode overlaps with the picture element electrodes, which are selected by different row selecting signals, cross talk between the picture elements due to capacity coupling will occur, depending on conditions. However, in cases where the conditions are such that the problems with regard to cross talk may not occur, the picture element gap electrode may be formed such that it may overlap with the picture element electrodes, which are selected by different row selecting signals.

In the first, second, third, and fourth embodiments described above, the reflection-type two-dimensional matrix spatial light modulation device in accordance with the present invention is provided with the single crystalline Si substrate. The reflection-type two-dimensional matrix spatial light modulation device in accordance with the present invention is also applicable when the picture element circuit comprises an insulating substrate, such as a glass substrate, and TFT with amorphous silicon (a-Si) or poly-Si, which is formed on the substrate.

Figure 33:
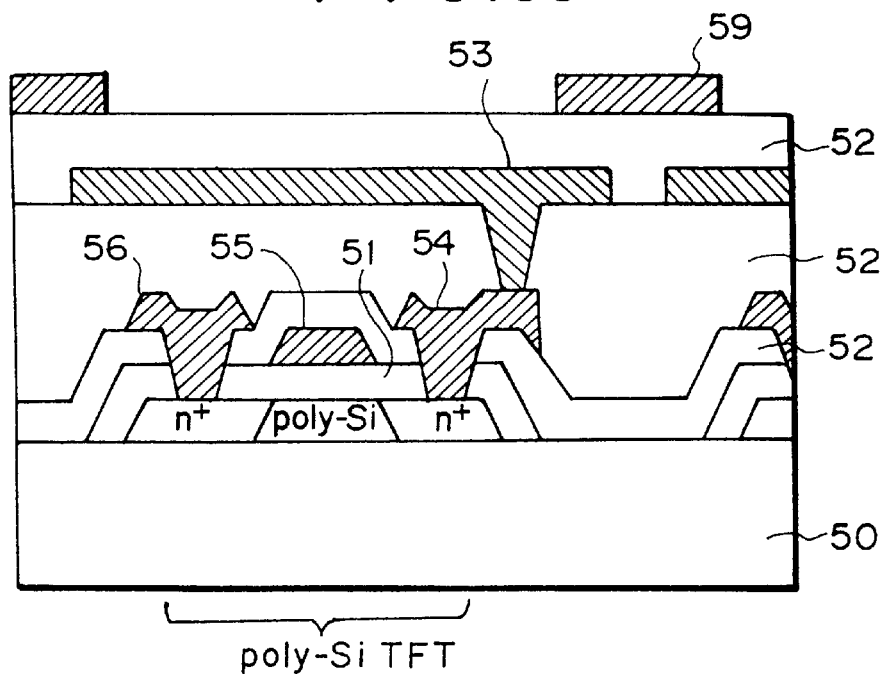
FIG. 33 is a schematic vertical sectional view showing a picture element section in a fifth embodiment of the reflection-type two-dimensional matrix spatial light modulation device in accordance with the present invention.
Figure 34:
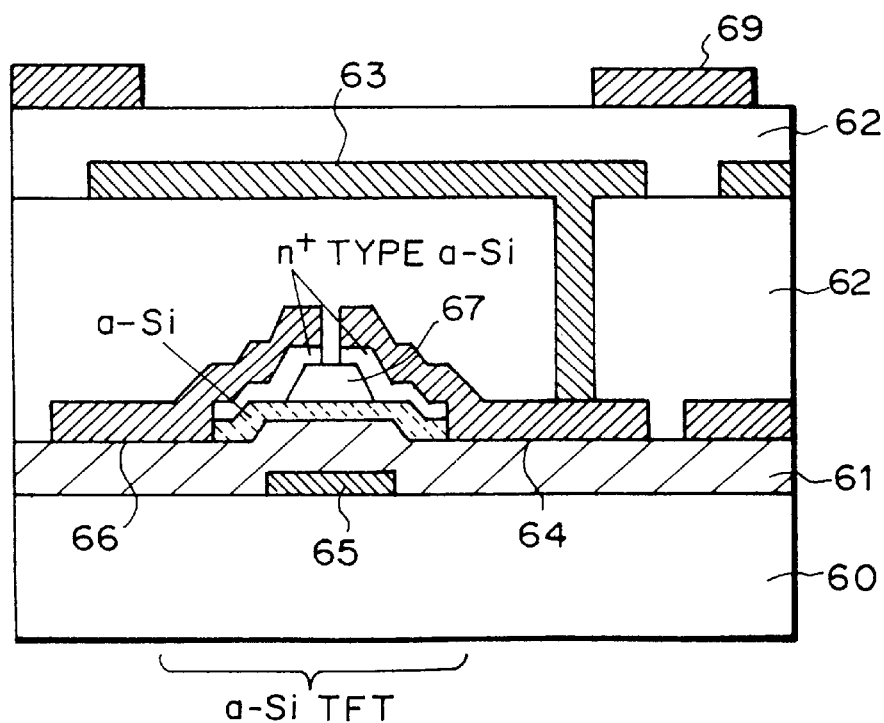
FIG. 34 is a schematic vertical sectional view showing a picture element section in a sixth embodiment of the reflection-type two-dimensional matrix spatial light modulation device in accordance with the present invention.

FIG. 33 and FIG. 34 show fifth and sixth embodiments having such a constitution.

<Fifth embodiment>

With reference to FIG. 33, a picture element circuit comprises a glass substrate 50 and an MOS-FET for a picture element, which is formed on the glass substrate 50 with a poly-Si TFT process. In FIG. 33, reference numeral 51 represents a gate insulation film, and reference numeral 52 represents layer-insulation films. Reference numeral 53 represents a picture element electrode (Al), and reference numeral 54 represents a source electrode. Reference numeral 55 represents a gate electrode, reference numeral 56 represents a drain electrode, and reference numeral 59 represents a picture element gap electrode (i.e., an electrically conductive film).

<Sixth embodiment>

With reference to FIG. 34, a picture element circuit comprises a glass substrate 60 and an MOS-FET for a picture element, which is formed on the glass substrate 60 with an a-Si TFT process. In FIG. 34, reference numeral 61 represents a gate insulation film (SiNx), and reference numeral 62 represents layer-insulation films. Reference numeral 63 represents a picture element electrode (Al), and reference numeral 64 represents a source electrode. Reference numeral 65 represents a gate electrode, and reference numeral 66 represents a drain electrode. Reference numeral 67 represents a channel protecting film (SiNx), and reference numeral 69 represents a picture element gap electrode (i.e., an electrically conductive film).

Besides the transistor, one of various other kinds of circuits may be employed as the picture element circuit. For example, the picture element circuit may be a circuit having memory functions, such as an SRAM.

Also, no limitation is imposed upon the operation mode of the liquid crystal, and one of various kinds of liquid crystals described above may be employed as the light modulation layer.

Further, the light modulation device may take on the form of a light emission type of element. By way of example, the light modulation device may take on the form of an electroluminescence (EL) element, in which an inorganic thin-film EL layer capable of emitting light with an electric field is utilized as the light modulation layer.

Figure 35:
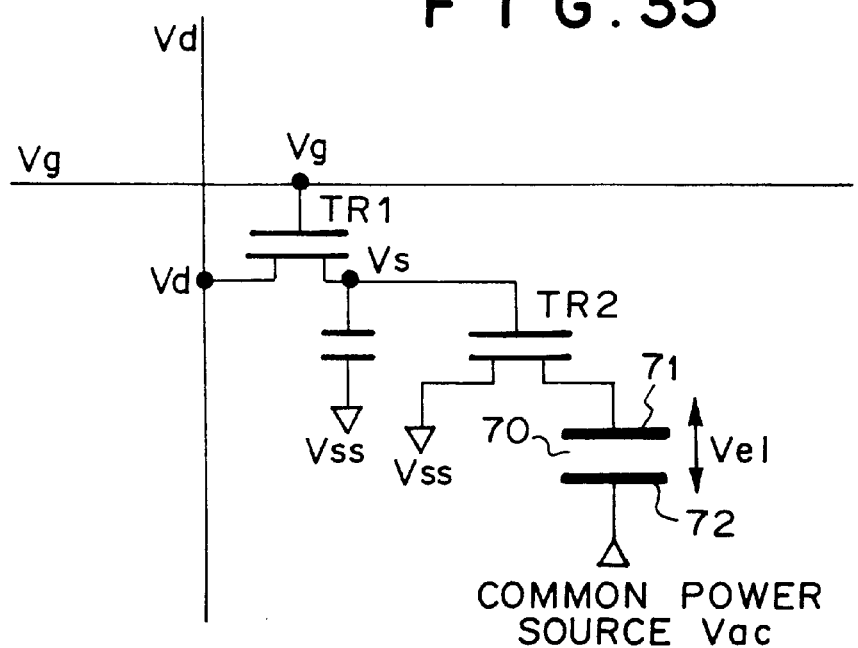
FIG. 35 is a circuit diagram showing a circuit equivalent to a picture element section of a spatial light modulation device, in which a thin-film electroluminescence element is utilized.

FIG. 35 is a circuit diagram showing a circuit equivalent to a picture element section of a spatial light modulation device, in which an inorganic thin-film EL element capable of emitting light with an electric field is utilized for light modulation. In FIG. 35, reference numeral 70 represents a thin-film EL layer, reference numeral 71 represents a picture element electrode for the thin-film EL layer 70, and reference numeral 72 represents an opposite electrode.

In the circuit shown in FIG. 35, with a selection pulse of a row selecting signal Vg, information of a "1" level or a "0" level is written from an information signal Vd into TR1 of an MOS-FET. In cases where the written information is of the "1" level, an output voltage Vs of TR1 is retained at a level such that TR2 of the MOS-FET may sufficiently goes to the conducting state. In cases where the written information is of the "0" level, the output voltage Vs of TR1 is retained at a level such that TR2 of the MOS-FET may sufficiently goes to the non-conducting state. The output voltage Vs of TR1 is retained until new information is written into TR1. The thin-film EL layer 70 is connected in series with TR2, and one terminal of TR2 is connected to a ground potential Vss of the circuit. The opposite electrode 72 of the thin-film EL layer 70 is connected to a common electric power source Vac.

The common electric power source Vac supplies an AC voltage of, typically, approximately 20 kHz, 100 Vrms. When TR2 is in the conducting state, a voltage Vel across the thin-film EL layer 70 becomes approximately equal to Vac, and the thin-film EL layer 70 emits light. When TR2 is in the non-conducting state, the voltage Vel across the thin-film EL layer 70 becomes lower than the voltage, at which the thin-film EL layer 70 emits light, and the thin-film EL layer 70 does not emit light. Therefore, when information of the "1" level is written into TR1, the light emission continues. When information of the "0" level is written into TR1, the light emission does not occur.

<Seventh embodiment>

Figure 36:
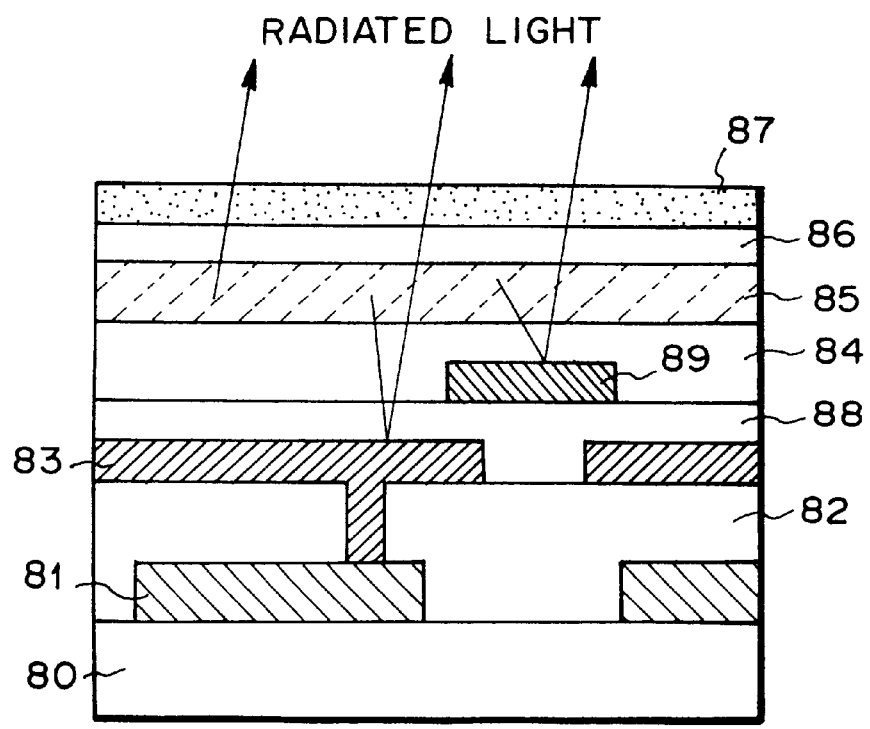
FIG. 36 is a schematic vertical sectional view showing a picture element section in a seventh embodiment of the reflection-type two-dimensional matrix spatial light modulation device in accordance with the present invention.

FIG. 36 is a schematic vertical sectional view showing a picture element section in a seventh embodiment of the reflection-type two-dimensional matrix spatial light modulation device in accordance with the present invention, wherein a thin-film EL element is utilized for light modulation. In this embodiment, a picture element circuit 81, which has a constitution as shown in FIG. 35, is formed on a semiconductor substrate 80. A picture element electrode (a metal reflecting film constituted of Al, or the like) 83 is formed with an layer-insulation film 82 intervening between the picture element electrode 83 and the picture element circuit 81. Also, a picture element gap electrode (i.e., an electrically conductive film) 89 is formed with an layer-insulation film 88 intervening between the picture element gap electrode 89 and the picture element electrode 83. The picture element gap electrode 89 is a floating electrode and is formed such that it may cover the gap between adjacent picture elements.

An insulation layer 84, an EL layer (by way of example, a ZnS:Mn thin film) 85, an insulation layer 86, and an opposite transparent electrode (ITO, or the like) 87 are laid in this order on the picture element gap electrode 89. The picture element section is formed in this manner. An electric power is supplied from the common electric power source Vac to the opposite transparent electrode 87. Light emitted by the EL layer 85 is radiated out upwardly in FIG. 36 directly or after being reflected by, for example, the picture element electrode 83.

However, with the conventional technique, in cases where the light emitted by the EL layer 85 impinges upon the gap between adjacent picture element electrodes 83, 83, problems occur in that the light enters into the picture element circuit and adversely affects it, or in that the light is absorbed by a light absorbing film, or the like, and the light utilization efficiency cannot be kept high. Also, with the conventional technique, the electric field at the region of the EL layer 85, which region is located on the gap between the adjacent picture elements, becomes unstable, and luminance of the emitted light becomes unstable. As a result, the problems occur in that the image quality cannot be kept high. Further, with the conventional technique, the problems occur in that the light emission is not effected due to the absence of a sufficient electric field, and the light utilization efficiency cannot be kept high.

However, with the constitution of FIG. 36 in accordance with the present invention, the light traveling toward the gap between the adjacent picture element electrodes 83, 83 is reflected upwardly by the picture element gap electrode 89. Also, the intensity of the electric field at the region of the EL layer 85, which region is located on the gap between the adjacent picture elements, becomes approximately equal to the intensity of the electric field at the region of the EL layer 85, which region is located on the picture element electrode. In cases where portions of the picture element gap electrode 89 overlap with the adjacent picture element electrodes, the intensity of the electric field at the region of the EL layer 85, which region is located on the gap between the adjacent picture elements, takes a value approximately equal to the mean value of the electric field intensities at the regions, which are located on the adjacent picture element electrodes. Therefore, the image quality obtained with the radiated light can be kept good, and at the same time the light utilization efficiency can be enhanced. Further, the picture element density can be kept high, and a high-definition device can be formed.

<Eighth embodiment>

Figure 37:
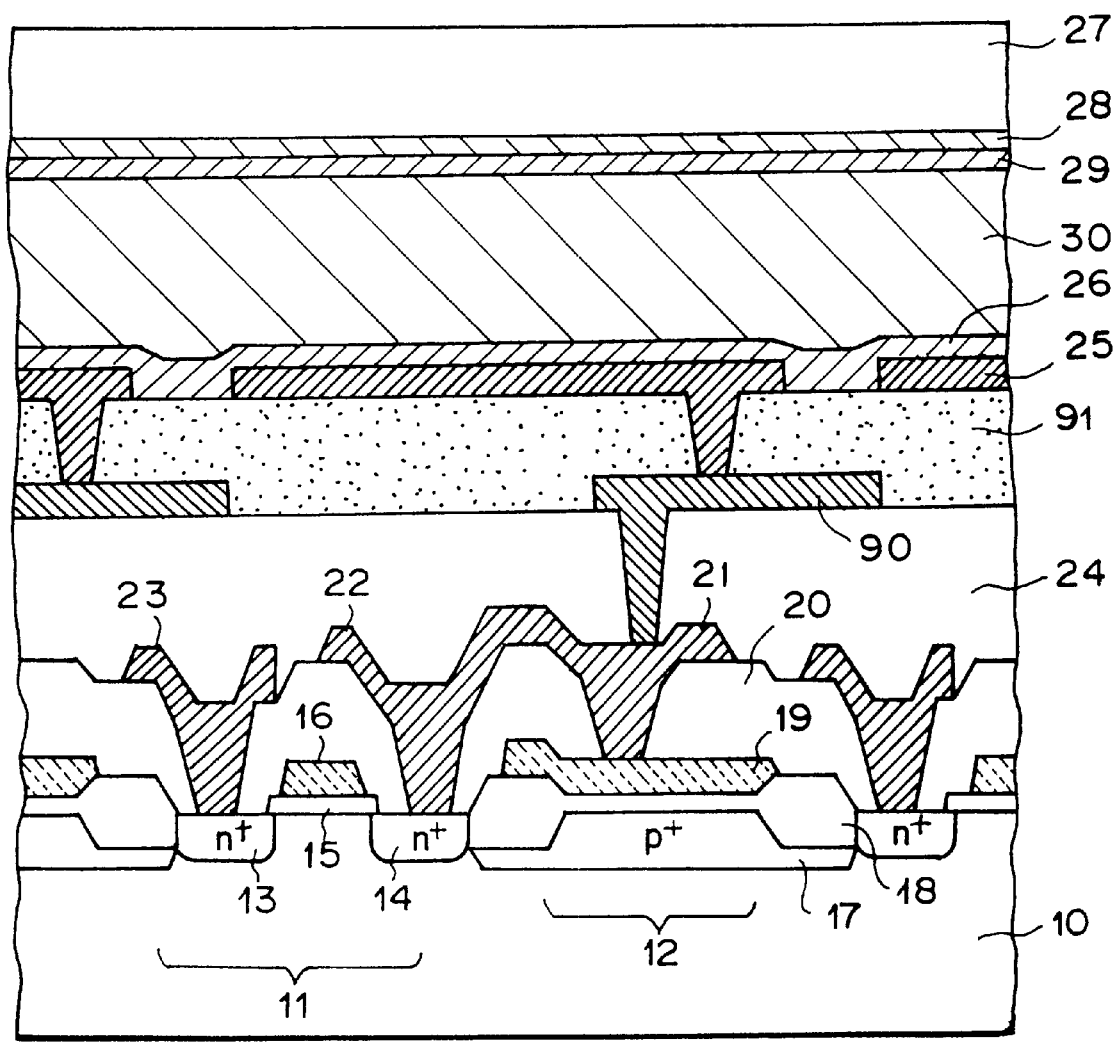
FIG. 37 is a schematic vertical sectional view showing a picture element section in an eighth embodiment of the reflection-type two-dimensional matrix spatial light modulation device in accordance with the present invention.

FIG. 37 is a schematic vertical sectional view showing a picture element section in an eighth embodiment of the reflection-type two-dimensional matrix spatial light modulation device in accordance with the present invention. As illustrated in FIG. 37, the n-MOS-FET 11 and the charge storage capacity Cstg 12 are formed on the single crystalline p$^-$-type silicon semiconductor substrate 10. The n-MOS-FET 11 comprises the n$^+$-type drain region 13, the n$^+$-type source region 14, the gate oxide film 15, and the gate electrode 16 constituted of a poly-Si film. The charge storage capacity Cstg 12 comprises the p$^+$ region 17, the oxide film 18, and the poly-Si film 19.

The first-layer Al wiring 21 is formed on the side across the first layer-insulation film 20, and the source electrode 22 connected to the source region 14 is thereby formed. The source region 14 and the poly-Si film 19 of the charge storage capacity Cstg 12 are connected to each other by the source electrode 22. The drain electrode 23 is connected to the drain region 13. Also, a picture element gap electrode (second-layer Al) 90, which serves as the electrically conductive film, is formed on the side across the second layer-insulation film 24 and is connected to the source electrode 22.

A third layer-insulation film 91 is formed on the picture element gap electrode 90. The picture element electrode (third-layer Al) 25, which has been subjected to patterning into a predetermined shape, is formed on the third layer-insulation film 91. The picture element gap electrode 90 covers the gap region between adjacent picture element electrodes 25, 25 with the third layer-insulation film 91 intervening between the picture element gap electrode 90 and the picture element electrodes 25, 25. Also, the picture element gap electrode 90 is formed such that a portion thereof may overlap with one of the picture element electrodes 25, 25. A single picture element electrode 25 is connected to a single picture element gap electrode 90. The orientation film 26 is formed on the picture element electrode 25.

The opposite transparent common electrode 28 constituted of ITO is formed on one side of the opposite transparent substrate 27, and the orientation film 29 is formed on the opposite transparent common electrode 28. The two substrates 10 and 27 are located such that the orientation film 26, which is combined integrally with the substrate 10, and the orientation film 29, which is combined integrally with the substrate 27, may stand facing each other. A liquid crystal 30, which constitutes a light modulation layer, is held between the orientation film 26 and the orientation film 29.

In order for the flatness of the picture element electrode 25 and the picture element gap electrode 90 to be enhanced, as the second layer-insulation film 24 and the third layer-insulation film 91, a flattened film, such as an SOG film, a BPSG reflow film, or a PI film, or a laminated film, which comprises such a flattened film and an insulation characteristics ensuring film, such as a silicon oxide film formed with a plasma-enhanced CVD process, should preferably be employed. Also, a flattening processing with polishing, such as CMP, should preferably be carried out.

FIG. 38 is a plan view showing the major part of the spatial light modulation device shown in FIG. 37.

In FIG. 38, the picture element electrode 25 is indicated by the bold solid line, and the picture element gap electrode 90 is hatched. In this embodiment, the picture element gap electrode 90 is formed such that it may cover portions of the picture element electrode 25, which is connected to the picture element gap electrode 90, and the gaps (in FIG. 38, the upper gap and the right gap) between the picture element electrode 25, which is connected to the picture element gap electrode 90, and the adjacent picture element electrodes 25, 25. As is clear from FIG. 38, in this embodiment, almost all of the plane region of the device is occupied by the picture element electrodes 25, 25, . . . and the picture element gap electrodes 90, 90, . . . .

Figure 39:
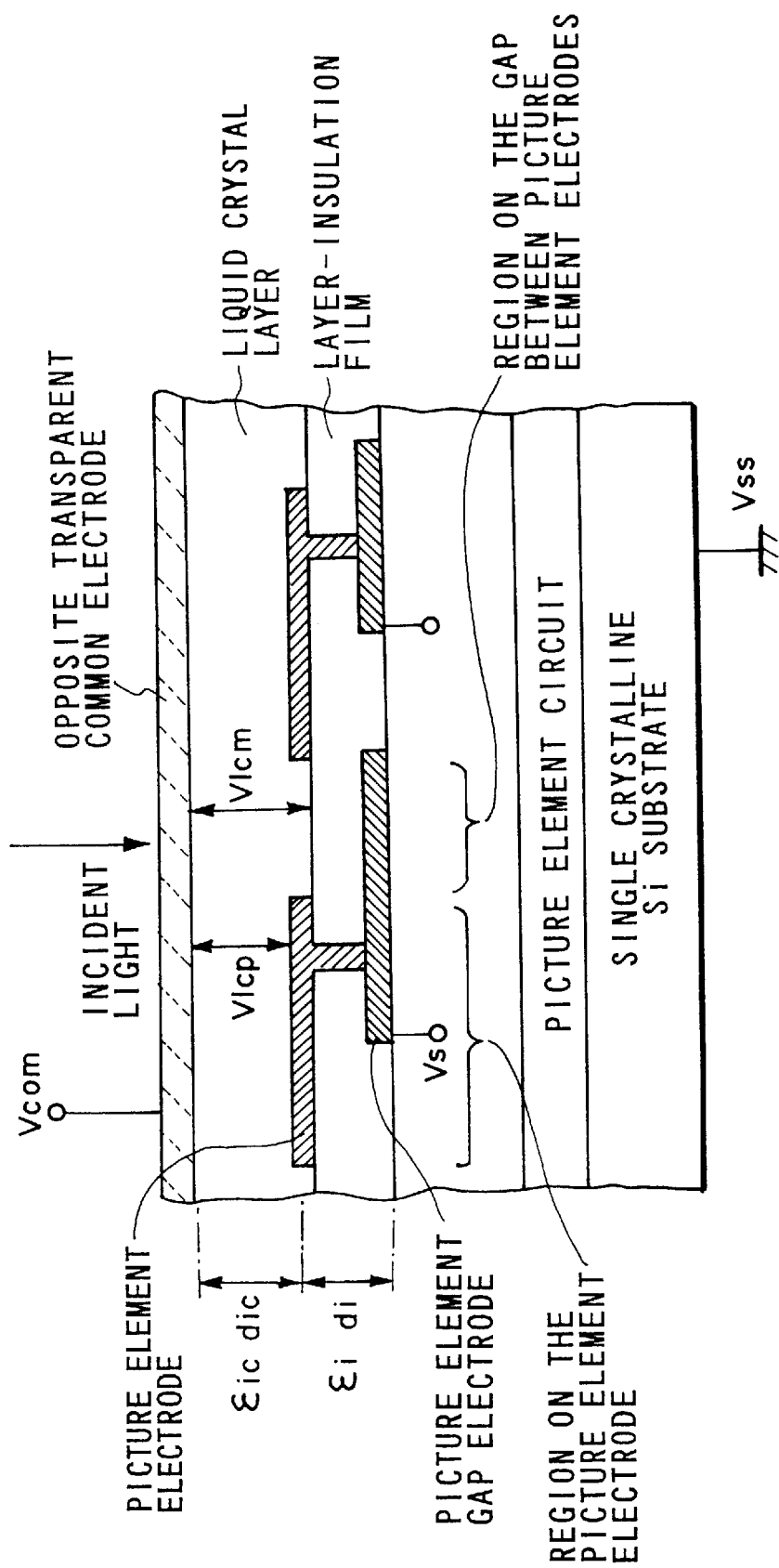
FIG. 39 is an explanatory sectional view showing a region, which stands facing a picture element electrode, and a region, which stands facing a gap between adjacent picture element electrodes, in the spatial light modulation device shown in FIG. 37.

How the spatial light modulation device having the constitution described above operates will be described hereinbelow. FIG. 39 is an explanatory sectional view showing a region, which stands facing a picture element electrode, and a region, which stands facing a gap between adjacent picture element electrodes, in the spatial light modulation device shown in FIG. 37. As illustrated in FIG. 39, the opposite transparent common electrode is connected to the potential Vcom on the light incidence side, and the picture element electrode is formed with the liquid crystal layer intervening between the picture element electrode and the opposite transparent common electrode. The layer-insulation film is located under the picture element electrode. The picture element gap electrode, which is electrically conductive and covers a portion of the picture element electrode and at least a portion of the gap between adjacent picture element electrodes, is formed under the layer-insulation film.

The picture element electrode and the picture element gap electrode are electrically connected to each other through a contact hole. Also, the picture element gap electrode is connected to the corresponding picture element circuit. The voltage of the picture element electrode, which is taken with respect to the potential Vcom, is represented by Vs. The film thickness and the relative dielectric constant of the layer-insulation film are represented respectively by di and $\epsilon_i$. The layer thickness and the relative dielectric constant of the liquid crystal layer are represented respectively by dlc and $\epsilon_{lc}$. In the strict sense, the relative dielectric constant of the liquid crystal layer varies in accordance with the state of orientation of the liquid crystal. However, it is herein considered that effects of the variation in the relative dielectric constant of the liquid crystal layer upon the operation and the effects of the spatial light modulation device in accordance with the present invention will be small, and $\epsilon_{lc}$ is taken as a mean-level value.

Figure 40:
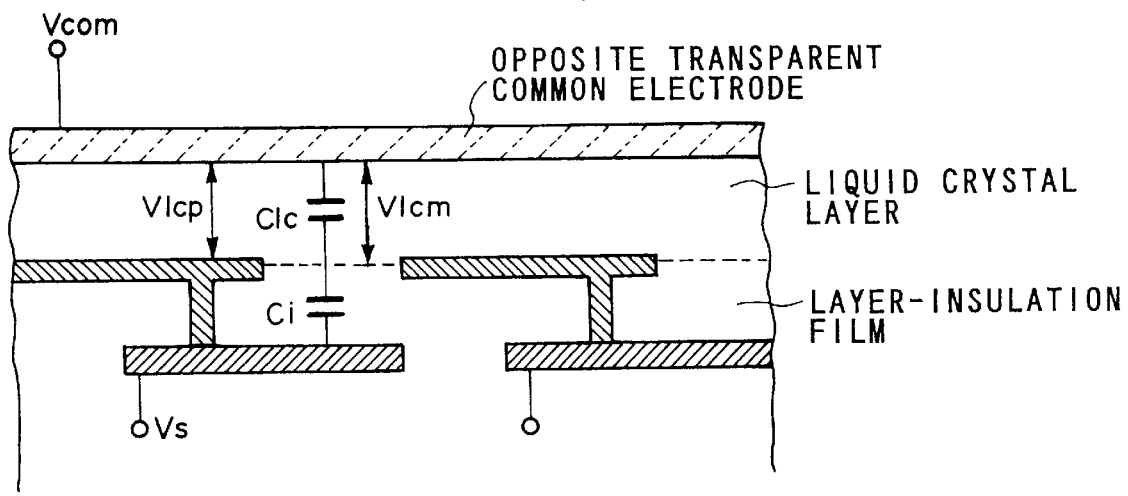
FIG. 40 is an explanatory view showing a capacity distribution in the constitution of FIG. 39.

FIG. 40 is an explanatory view showing a capacity distribution in the constitution of FIG. 39.

With reference to FIG. 40, the capacity per unit area of the layer-insulation film and the capacity per unit area of the liquid crystal layer are represented respectively by Ci and Clc. In such cases, the liquid crystal layer voltage Vclp at the region, which is located on the picture element electrode, and the liquid crystal layer voltage Vlcm at the region, which is located on the picture element gap electrode, may be represented by Formulas (13), (14), and (15) shown below.

$$Vlcp = Vs \qquad (13)$$

$$Vlcm = \frac{Ci}{Clc + Ci} Vs \qquad (14)$$

$$\therefore Vlcm = \frac{Ci}{Clc + Ci} Vlcp \qquad (15)$$

If the permittivity of vacuum is represented by $\epsilon_0$, Ci and Clc may be represented by Formulas (16) and (17) shown below.

$$Ci = \frac{\epsilon_0 \epsilon_i}{di} \qquad (16)$$

$$Clc = \frac{\epsilon_0 \epsilon_{lc}}{dlc} \qquad (17)$$

Figure 41:
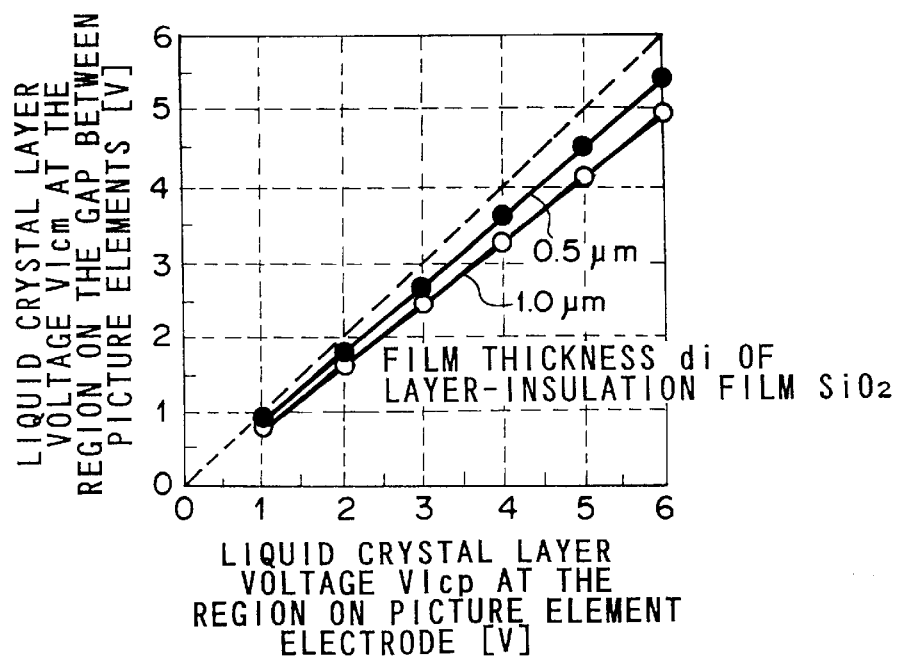
FIG. 41 is a graph showing the relationship between the liquid crystal layer voltage at the region, which is located on a picture element electrode, and the liquid crystal layer voltage at the region, which stands facing the gap between the adjacent picture elements, in the spatial light modulation device shown in FIG. 37.

The relationship between Vlcm and Vlcp was calculated by substituting physical property values in concrete constitution examples into Formulas (15), (16), and (17) shown above. FIG. 41 is a graph showing the liquid crystal layer voltages at the respective regions under the film conditions in the concrete constitution examples. In FIG. 41, the liquid crystal layer voltage Vclp at the region, which is located on the picture element electrode, is plotted on the horizontal axis. The liquid crystal layer voltage Vlcm at the region, which is located on the picture element gap electrode, is plotted on the vertical axis. In the examples, the film thickness di of the layer-insulation film constituted of an SiO$_2$ film was taken as a parameter and was set such that di=0.5 $\mu$m, 1.0 $\mu$m. As the other conditions, representative values of ordinarily practicable materials were employed. Specifically, the relative dielectric constant $\epsilon_i$ of the layer-insulation film is equal to 4. The relative dielectric constant $\epsilon_{lc}$ of the liquid crystal layer is equal to 5, and its layer thickness dlc is equal to 6 $\mu$m.

As is clear from FIG. 41, the liquid crystal layer voltage Vlcm at the region, which is located on the picture element gap electrode, is in proportion to the liquid crystal layer voltage Vclp at the region, which is located on the picture element electrode. Also, in cases where di=1.0 $\mu$m, Vlcm is at least 80% of Vlcp. In cases where di=0.5 $\mu$m, Vlcm is at least 90% of Vlcp. Therefore, the modulated output light, which is reflected from the picture element gap electrode, is of the characteristics approximately identical with the characteristics of the modulated output light, which is obtained from the region located on the picture element electrode. Accordingly, by the effects of reducing the interference due to the formation of a lattice-like black matrix, or the like, the image quality obtained with the output light can be kept good, the incident light at the region facing the gap between the adjacent picture elements, which light has heretofore been ineffective, can be utilized efficiently, and the amount of the output light as a whole can be kept large.

Figure 42:
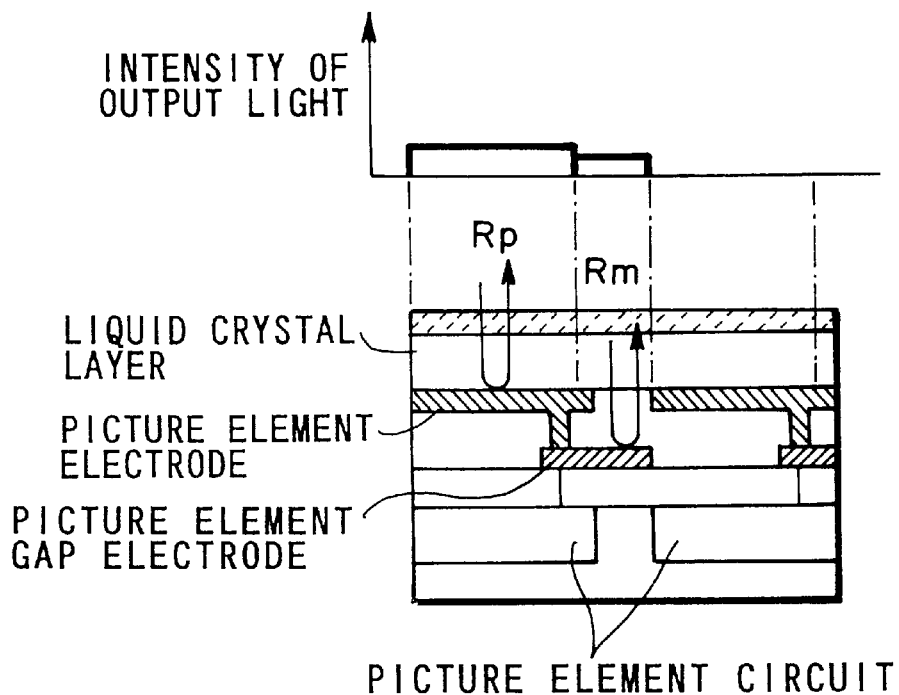
FIG. 42 is an explanatory view showing an output light intensity, which is obtained in the spatial light modulation device shown in FIG. 37 when the picture element voltage is comparatively low.
Figure 43:
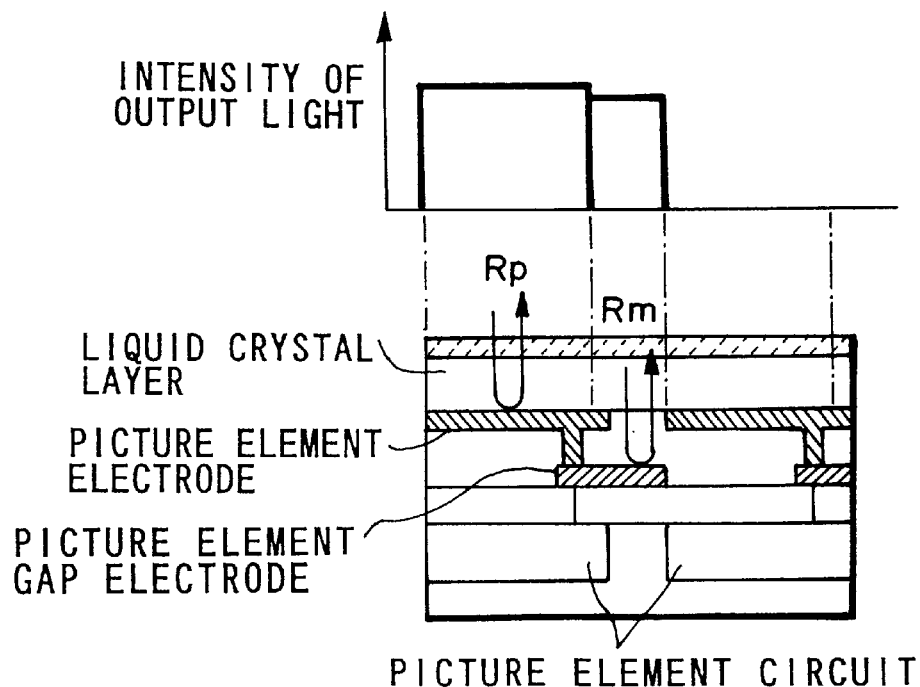
FIG. 43 is an explanatory view showing an output light intensity, which is obtained in the spatial light modulation device shown in FIG. 37 when the picture element voltage is comparatively high.

FIG. 42 schematically shows the distribution of the output light intensity, which is obtained in the spatial light modulation device shown in FIG. 37 when the picture element voltage is comparatively low. FIG. 43 schematically shows the distribution of the output light intensity, which is obtained in the spatial light modulation device shown in FIG. 37 when the picture element voltage is comparatively high.

Also, since the light entering through the region, which faces the gap between the adjacent picture elements, into the interior can be reduced markedly, the occurrence of the problems with regard to the variation in picture element potential due to incidence of light upon the picture element circuits can be reduced markedly.

As is clear from Formulas (15), (16), and (17), in order for the liquid crystal layer voltage Vlcm at the region, which is located on the picture element gap electrode, to be rendered close to the liquid crystal layer voltage Vclp at the region, which is located on the picture element electrode, the film thickness di of the layer-insulation film may be set to be thin. It is also efficient to use an insulation film having a large dielectric constant $\epsilon i$. Further, the layer thickness dlc of the liquid crystal layer may be set to be thin, or a liquid crystal having a small dielectric constant $\epsilon lc$ may be selected. However, it is ordinarily not easy to alter the physical properties on the side of the liquid crystal layer, and therefore the conditions of the insulation film should preferably be selected appropriately.

Figure 44:
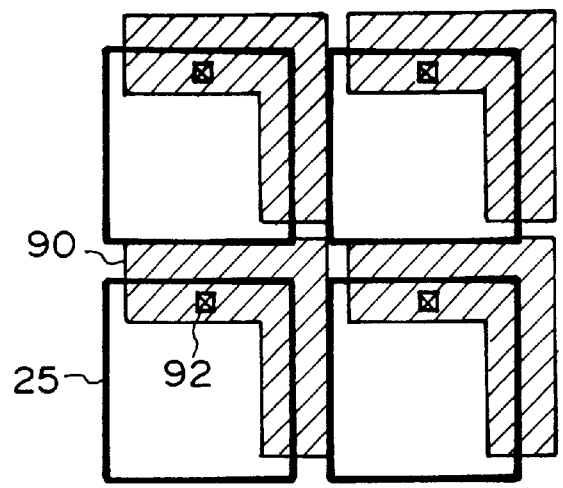
FIG. 44 is a schematic plan view showing how picture element electrodes and picture element gap electrodes are located in the spatial light modulation device shown in FIG. 37.

FIG. 44 is a schematic plan view showing how the picture element electrodes 25, 25, . . . and picture element gap electrodes 90, 90, . . . are located in the eighth embodiment of FIG. 37. Other electrode shapes and other overlapping states may also be employed. (In FIG. 44, reference numeral 92 represents a contact hole for connecting the picture element electrode 25 and the picture element gap electrode 90 to each other.)

In particular, the picture element gap electrode, which is connected to a certain picture element electrode, may also overlap with an adjacent picture element electrode. In such cases, there is the risk that the overlapping portion will cause capacity coupling with the adjacent picture element to occur, and cross talk will occur. However, in cases where the conditions are such that the problems with regard to image quality may not occur, the picture element gap electrode, which is connected to a certain picture element electrode, may also overlap with the adjacent picture element electrode.

Figure 45:
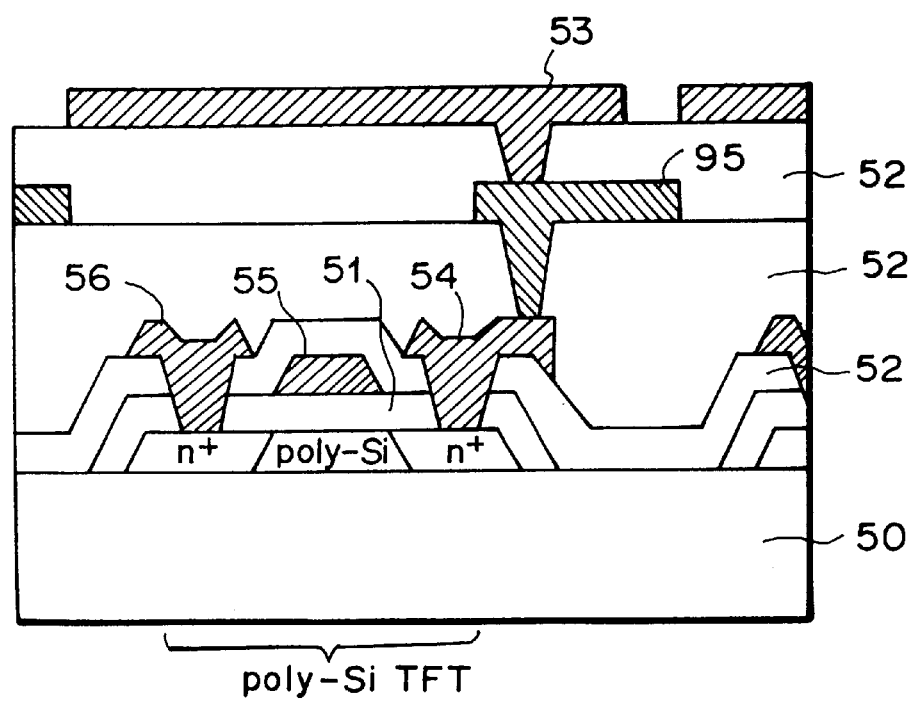
FIG. 45 is a schematic vertical sectional view showing a picture element section in a ninth embodiment of the reflection-type two-dimensional matrix spatial light modulation device in accordance with the present invention.
Figure 46:
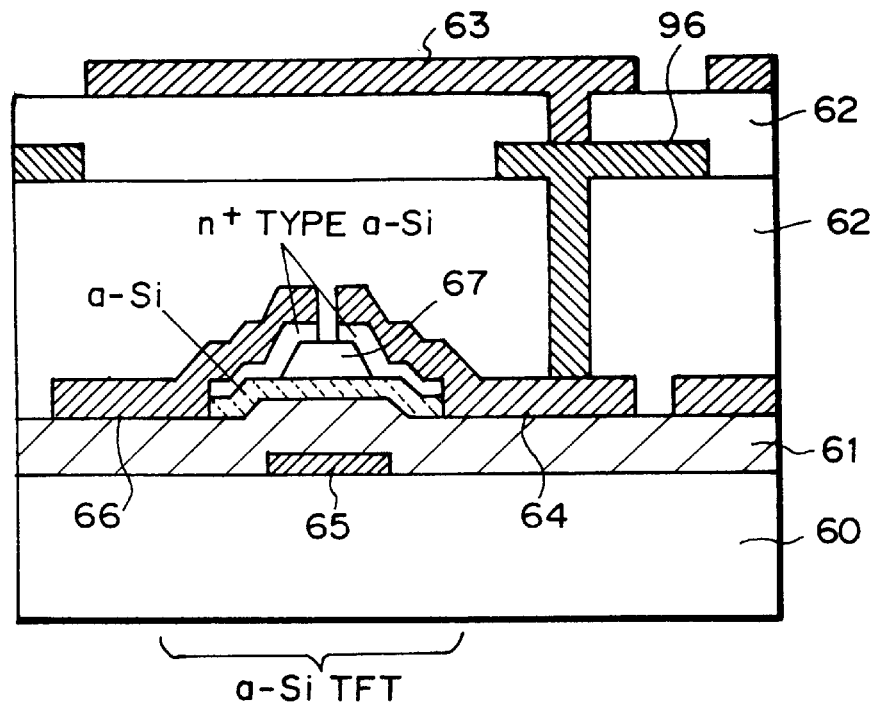
FIG. 46 is a schematic vertical sectional view showing a picture element section in a tenth embodiment of the reflection-type two-dimensional matrix spatial light modulation device in accordance with the present invention.

In the eighth embodiment described above, the reflection-type two-dimensional matrix spatial light modulation device in accordance with the present invention is provided with the single crystalline Si substrate. In cases where the picture element gap electrode 90 connected to the picture element electrode 25 is utilized as in the eighth embodiment, it is possible to employ a picture element circuit comprising an insulating substrate, such as a glass substrate, and TFT with amorphous silicon (a-Si) or poly-Si, which is formed on the substrate. FIG. 45 and FIG. 46 show ninth and tenth embodiments having such a constitution.

<Ninth embodiment>

With reference to FIG. 45, a picture element circuit comprises the glass substrate 50 and the MOS-FET for a picture element, which is formed on the glass substrate 50 with the poly-Si TFT process. In FIG. 45, reference numeral 51 represents the gate insulation film, and reference numeral 52 represents the layer-insulation films. Reference numeral 53 represents the picture element electrode (Al), and reference numeral 54 represents the source electrode. Reference numeral 55 represents the gate electrode, reference numeral 56 represents the drain electrode, and reference numeral 95 represents a picture element gap electrode (i.e., an electrically conductive film).

<Tenth embodiment>

With reference to FIG. 46, a picture element circuit comprises the glass substrate 60 and the MOS-FET for a picture element, which is formed on the glass substrate 60 with the a-Si TFT process. In FIG. 46, reference numeral 61 represents the gate insulation film (SiNx), and reference numeral 62 represents the layer-insulation films. Reference numeral 63 represents the picture element electrode (Al), and reference numeral 64 represents the source electrode. Reference numeral 65 represents the gate electrode, and reference numeral 66 represents the drain electrode. Reference numeral 67 represents the channel protecting film (SiNx), and reference numeral 96 represents a picture element gap electrode (i.e., an electrically conductive film).

Besides the transistor, one of various other kinds of circuits may be employed as the picture element circuit. For example, the picture element circuit may be a circuit having memory functions, such as an SRAM.

Also, in cases where the picture element gap electrode connected to the picture element electrode is utilized, the light modulation device may take on the form of a light emission type of element. By way of example, the light modulation device may take on the form of the thin-film EL element described above with reference to FIG. 35.

<Eleventh embodiment>

Figure 47:
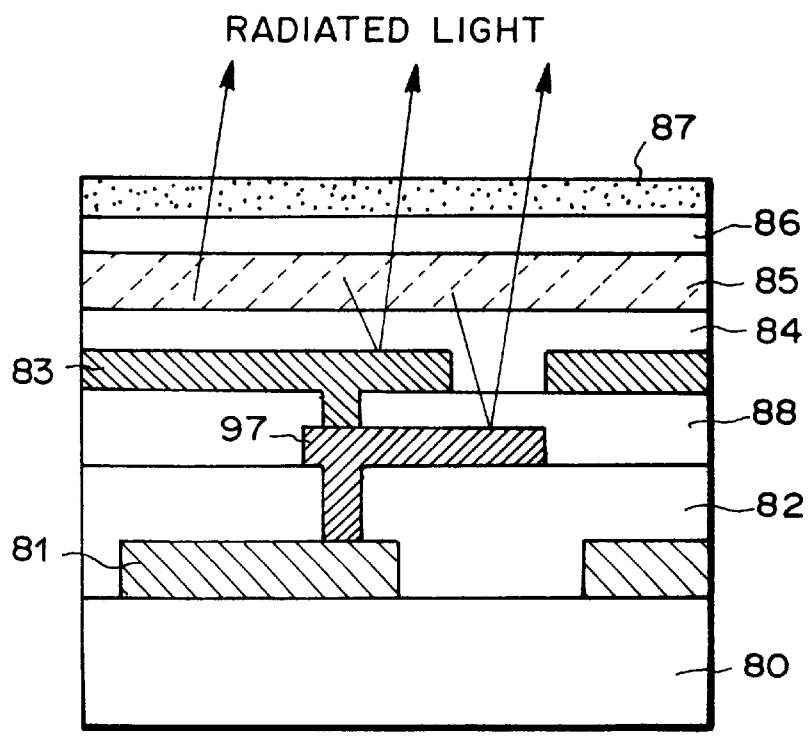
FIG. 47 is a schematic vertical sectional view showing a picture element section in an eleventh embodiment of the reflection-type two-dimensional matrix spatial light modulation device in accordance with the present invention.

FIG. 47 is a schematic vertical sectional view showing a picture element section in an eleventh embodiment of the reflection-type two-dimensional matrix spatial light modulation device in accordance with the present invention, wherein a thin-film EL element is utilized for light modulation. In this embodiment, the picture element circuit 81, which has a constitution as shown in FIG. 35, is formed on the semiconductor substrate 80. A picture element gap electrode 97 (i.e., an electrically conductive film) is formed with the layer-insulation film 82 intervening between the picture element gap electrode 97 and the picture element circuit 81. Also, the picture element electrode (a metal reflecting film constituted of Al, or the like) 83 is formed with the layer-insulation film 88 intervening between the picture element electrode 83 and the picture element gap electrode 97. The picture element gap electrode 97 is connected to the picture element electrode 83 and is formed such that it may cover the gap between adjacent picture elements.

The insulation layer 84, the EL layer (by way of example, a ZnS:Mn thin film) 85, the insulation layer 86, and the opposite transparent electrode (ITO, or the like) 87 are laid in this order on the picture element gap electrode 89. The picture element section is formed in this manner. An electric power is supplied from the common electric power source Vac to the opposite transparent electrode 87. Light emitted by the EL layer 85 is radiated out upwardly in FIG. 47 directly or after being reflected by, for example, the picture element electrode 83.

However, with the conventional technique, in cases where the light emitted by the EL layer 85 impinges upon the gap between adjacent picture element electrodes 83, 83, problems occur in that the light enters into the picture element circuit and adversely affects it, or in that the light is absorbed by a light absorbing film, or the like, and the light utilization efficiency cannot be kept high. Also, with the conventional technique, the electric field at the region of the EL layer 85, which region is located on the gap between the adjacent picture elements, becomes unstable, and luminance of the emitted light becomes unstable. As a result, the problems occur in that the image quality cannot be kept high. Further, with the conventional technique, the problems occur in that the light emission is not effected due to the absence of a sufficient electric field, and the light utilization efficiency cannot be kept high.

However, with the constitution of FIG. 47 in accordance with the present invention, the light traveling toward the gap between the adjacent picture element electrodes 83, 83 is reflected upwardly by the picture element gap electrode 97. Also, the intensity of the electric field at the region of the EL layer 85, which region is located on the gap between the adjacent picture elements, becomes approximately equal to the intensity of the electric field at the region of the EL layer 85, which region is located on the picture element electrode. Therefore, the image quality obtained with the radiated light can be kept good, and at the same time the light utilization efficiency can be enhanced. Further, the picture element density can be kept high, and a high-definition device can be formed.

In cases where the picture element gap electrode connected to the picture element electrode is utilized as in the eighth, ninth, tenth, and eleventh embodiments described above, or in cases where the picture element gap electrode not connected to the picture element electrode is utilized as in the first through seventh embodiments described above, the following apply.

There are a wide variety of combinations of the shape of the picture element gap electrode and the overlapping state of the picture element electrode and the picture element gap electrode with each other. Without departing from the scope of the present invention, an appropriate combination may be selected from such various combinations.

Also, it is only necessary that the picture element gap electrode be electrically conductive. The picture element gap electrode should preferably be formed from a material exhibiting the optical characteristics identical with or approximately identical with those of the material for the picture element electrode. The picture element gap electrode may be a light absorbing film. In such cases, even though the effects of enhancing the light utilization efficiency are not obtained, the liquid crystal layer voltage at the region, which is located on the picture element gap electrode, becomes approximately equal to the liquid crystal layer voltage at the region, which is located on the picture element electrode, or becomes approximately equal to the mean value of the liquid crystal layer voltages at the adjacent picture elements. Therefore, the effects of restricting the disturbance of the orientation of the liquid crystal at the boundary region of the picture element electrode can be obtained. Also, the effects of blocking the picture element circuit from the leaking light can be obtained.

The material for the layer-insulation films may be selected from a wide variety of materials, which do not cause optical problems to occur. The material for the layer-insulation films should preferably be selected from materials, which are transparent with respect to the light to be processed, which exhibit little birefringence, little scattering, or the like, and which has a large dielectric constant.

Further, an anti-reflection film with respect to the wavelengths of the light to be processed may be located between the insulation film and the liquid crystal layer, such that unnecessary reflection at the insulation film interface may be prevented from occurring.

Furthermore, either one or both of the insulation films and the lower-layer film of the electrically conductive film (i.e., the picture element gap electrode) should preferably be constituted of flattened films as described above with reference to the first embodiment.

An insulating reflection film, such as a dielectric multilayer film, may be formed on at least one surface of each picture element electrode and at least one surface of each picture element gap electrode. The insulating reflection film may thus be formed with respect to each picture element or for the entire surface of the device. An electrically conductive reflection film, which is formed from a material different from the materials of the picture element electrode and the picture element gap electrode, may be formed with respect to each picture element.

What is claimed is:

1. A reflection-type two-dimensional matrix spatial light modulation device, comprising:
   i) a plurality of picture element electrodes, which are located in the form of a two-dimensional matrix made up of rows and columns,
   ii) an opposite electrode, which is located at a spacing from the picture element electrodes, and
   iii) a light modulation layer, which is located between the opposite electrode and the picture element electrodes, the light modulation layer modulating light, which enters from the side of the opposite electrode into the light modulation layer and is then reflected from the picture element electrodes (or from reflection members located at positions deeper than the picture element electrodes), in accordance with a voltage applied across the light modulation layer by the opposite electrode and each of the picture element electrodes, wherein the improvement comprises the provision of:
   a) an insulation film, which is formed between the light modulation layer and the picture element electrodes, and
   b) an electrically conductive film, which is formed with said insulation film intervening between said electrically conductive film and the picture element electrodes, said electrically conductive film covering at least a portion of a gap between adjacent picture element electrodes.

2. A device as defined in claim 1 wherein said electrically conductive film is in an electrically floating state.

3. A device as defined in claim 1 wherein said electrically conductive film has a shape such that a portion thereof may overlap with at least one picture element electrode.

4. A device as defined in claim 3 wherein said electrically conductive film has a shape such that it may cover the gap between a plurality of adjacent picture element electrodes and may have regions overlapping with a plurality of picture element electrodes.

5. A device as defined in claim 3 wherein the voltage applied across a portion of the light modulation layer, which portion is located on said electrically conductive film, is approximately in proportion to the voltage applied across a portion of the light modulation layer, which portion is located on the picture element electrode having a region overlapping with said electrically conductive film.

6. A device as defined in claim 5 wherein the voltage applied across the portion of the light modulation layer, which portion is located on said electrically conductive film, takes a value approximately equal to the voltage applied across the portion of the light modulation layer, which portion is located on the picture element electrode having a region overlapping with said electrically conductive film.

7. A device as defined in claim 3 wherein the voltage applied across a portion of the light modulation layer, which portion is located on said electrically conductive film, takes an intermediate value between the voltages applied across portions of the light modulation layer, which portions are located on a plurality of picture element electrodes having regions overlapping with said electrically conductive film.

8. A device as defined in claim 7 wherein the voltage applied across the portion of the light modulation layer, which portion is located on said electrically conductive film, takes an approximately mean value of the voltages applied across the portions of the light modulation layer, which portions are located on a plurality of picture element electrodes having regions overlapping with said electrically conductive film.

9. A device as defined in claim 1 wherein said electrically conductive film is a light reflecting film, which reflects the light entering from the side of the opposite electrode.

10. A device as defined in claim 1 wherein said electrically conductive film is a light absorbing film, which absorbs the light entering from the side of the opposite electrode.

11. A device as defined in claim 1 wherein said electrically conductive film has reflecting, absorbing, or scattering characteristics approximately identical with those of the picture element electrodes.

12. A device as defined in claim 1 wherein an anti-reflection film for the light entering from the side of the opposite electrode is located between said insulation film and the light modulation layer.

13. A device as defined in claim 1 wherein either one or both of said insulation film and a lower-layer film of said electrically conductive film are constituted of flattened films.

14. A device as defined in claim 1 wherein said insulation film is transparent.

15. A device as defined in claim 1 wherein the light modulation layer is a liquid crystal layer.

16. A device as defined in claim 1 wherein the light modulation layer is an electroluminescence layer.

17. A device as defined in claim 1 wherein a picture element circuit, which controls the voltage applied across the light modulation layer by the opposite electrode and each of the picture element electrodes, is constituted of a circuit containing an active element with a single crystalline semiconductor.

18. A device as defined in claim 1 wherein a picture element circuit, which controls the voltage applied across the light modulation layer by the opposite electrode and each of the picture element electrodes, is constituted of a circuit containing an active element with a polycrystalline semiconductor.

19. A device as defined in claim 1 wherein a picture element circuit, which controls the voltage applied across the light modulation layer by the opposite electrode and each of the picture element electrodes, is constituted of a circuit containing an active element with an amorphous semiconductor.

20. A reflection-type two-dimensional matrix spatial light modulation device, comprising:

i) a plurality of picture element electrodes, which are located in the form of a two-dimensional matrix made up of rows and columns, ii) an opposite electrode, which is located at a spacing from the picture element electrodes, and iii) a light modulation layer, which is located between the opposite electrode and the picture element electrodes, the light modulation layer modulating light, which enters from the side of the opposite electrode into the light modulation layer and is then reflected from the picture element electrodes (or from reflection members located at positions deeper than the picture element electrodes), in accordance with a voltage applied across the light modulation layer by the opposite electrode and each of the picture element electrodes, wherein the improvement comprises the provision of:

a) an insulation film, which is formed on the side of the picture element electrodes opposite to the light modulation layer with the picture element electrodes intervening between said insulation film and the light modulation layer, and b) an electrically conductive film, which is formed with said insulation film intervening between said electrically conductive film and the picture element electrodes, said electrically conductive film covering at least a portion of a gap between adjacent picture element electrodes, said electrically conductive film being electrically connected to at least one of the picture element electrodes constituting said gap.

21. A device as defined in claim 20 wherein the voltage applied across a portion of the light modulation layer, which portion is located on said electrically conductive film, is approximately in proportion to the voltage applied across a portion of the light modulation layer, which portion is located on the picture element electrode electrically connected to said electrically conductive film.

22. A device as defined in claim 21 wherein the voltage applied across the portion of the light modulation layer, which portion is located on said electrically conductive film, takes a value approximately equal to the voltage applied across the portion of the light modulation layer, which portion is located on the picture element electrode electrically connected to said electrically conductive film.

23. A device as defined in claim 20 wherein said electrically conductive film is a light reflecting film, which reflects the light entering from the side of the opposite electrode.

24. A device as defined in claim 20 wherein said electrically conductive film is a light absorbing film, which absorbs the light entering from the side of the opposite electrode.

25. A device as defined in claim 20 wherein said electrically conductive film has reflecting, absorbing, or scattering characteristics approximately identical with those of the picture element electrodes.

26. A device as defined in claim 20 wherein an anti-reflection film for the light entering from the side of the opposite electrode is located between said insulation film and the light modulation layer.

27. A device as defined in claim 20 wherein either one or both of said insulation film and a lower-layer film of said electrically conductive film are constituted of flattened films.

28. A device as defined in claim 20 wherein said insulation film is transparent.

29. A device as defined in claim 20 wherein the light modulation layer is a liquid crystal layer.

30. A device as defined in claim 20 wherein the light modulation layer is an electroluminescence layer.

31. A device as defined in claim 20 wherein a picture element circuit, which controls the voltage applied across the light modulation layer by the opposite electrode and each of the picture element electrodes, is constituted of a circuit containing an active element with a single crystalline semiconductor.

32. A device as defined in claim 20 wherein a picture element circuit, which controls the voltage applied across the light modulation layer by the opposite electrode and each of the picture element electrodes, is constituted of a circuit containing an active element with a polycrystalline semiconductor.

33. A device as defined in claim 20 wherein a picture element circuit, which controls the voltage applied across the light modulation layer by the opposite electrode and each of the picture element electrodes, is constituted of a circuit containing an active element with an amorphous semiconductor.

* * * * *